(12) United States Patent
Ito

(10) Patent No.: US 10,577,027 B2
(45) Date of Patent: Mar. 3, 2020

(54) AUTOMOBILE BODY PRESS-MOLDED COMPONENT AND METHOD FOR PRODUCING SAME

(71) Applicant: NIPPON STEEL & SUMITOMO METAL CORPORATION, Tokyo (JP)

(72) Inventor: Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/326,152

(22) PCT Filed: Jul. 24, 2017

(86) PCT No.: PCT/JP2017/026671
§ 371 (c)(1),
(2) Date: Feb. 15, 2019

(87) PCT Pub. No.: WO2018/034104
PCT Pub. Date: Feb. 22, 2018

(65) Prior Publication Data
US 2019/0185070 A1 Jun. 20, 2019

(30) Foreign Application Priority Data

Aug. 18, 2016 (JP) ................................. 2016-160722

(51) Int. Cl.
*B62D 25/20* (2006.01)
*B21D 53/88* (2006.01)
(Continued)

(52) U.S. Cl.
CPC ......... *B62D 25/2009* (2013.01); *B21D 19/08* (2013.01); *B21D 22/02* (2013.01);
(Continued)

(58) Field of Classification Search
CPC ........................... B62D 25/2009; B62D 25/20
See application file for complete search history.

(56) References Cited

U.S. PATENT DOCUMENTS

2015/0061323 A1\* 3/2015 Otsuka ................ B62D 21/157
296/187.12
2015/0367392 A1 12/2015 Nishimura et al.
2017/0008573 A1\* 1/2017 Otsuka ................ B62D 27/023

FOREIGN PATENT DOCUMENTS

CN 104492911 A 4/2015
CN 204234571 U 4/2015
(Continued)

OTHER PUBLICATIONS

Chinese Office Action and Search Report, dated Jul. 1, 2019, for counterpart Application No. 201780050343.0, along with an English translation of the Chinese Search Report.
(Continued)

*Primary Examiner* — Samir Shah
*Assistant Examiner* — Tong Guo
(74) *Attorney, Agent, or Firm* — Birch, Stewart, Kolasch & Birch, LLP

(57) ABSTRACT

A member has a transverse cross section that includes a top sheet, upper ridgelines, vertical walls, lower ridgelines, and floor flanges and includes, on at least one end portions in the extending directions of the upper ridgelines, a top sheet flange via a top sheet ridgeline and vertical wall flanges via vertical wall ridgelines, in which the vertical wall flange and the floor flange are continuous. In end portions of the upper ridgelines and the lower ridgelines, the sum total$\Sigma R$ of the radii of curvature of corner portions of the vertical walls and the sum total$\Sigma L$ of the widths of the top sheet and the vertical walls in an end portion of the member have the relation of$\Sigma R/\Sigma L \leq 0.13$.

5 Claims, 29 Drawing Sheets

(51) Int. Cl.
  *B21D 19/08* (2006.01)
  *B21D 22/21* (2006.01)
  *B21D 22/02* (2006.01)
  *B21D 47/04* (2006.01)
  *B21D 51/52* (2006.01)

(52) U.S. Cl.
  CPC ............ *B21D 22/21* (2013.01); *B21D 47/04* (2013.01); *B21D 53/88* (2013.01); *B21D 51/52* (2013.01); *B62D 25/20* (2013.01)

(56) References Cited

FOREIGN PATENT DOCUMENTS

| CN | 204470401 | U  | 7/2015 |
|----|-----------|----|--------|
| JP | 52-15531  |    | 2/1977 |
| JP | 2-141372  | A  | 5/1990 |
| JP | 4-118118  | A  | 4/1992 |
| JP | 7-112219  | A  | 5/1995 |
| JP | 2554768   | B2 | 11/1996 |
| JP | 2560416   | B2 | 12/1996 |
| JP | 2996031   | B2 | 12/1999 |
| JP | 2010-173473 | A | 8/2010 |
| JP | 5569661   | B2 | 8/2014 |
| JP | 2015-74354 | A | 4/2015 |
| JP | 2015-81036 | A | 4/2015 |
| RU | 2057606   | C1 | 4/1996 |
| RU | 2116854   | C1 | 8/1998 |
| SU | 759177    | A1 | 8/1980 |
| WO | WO 2013154114 | * | 10/2013 |
| WO | WO2015133531 | * | 3/2015 |
| WO | WO 2015/133531 | A1 | 9/2015 |

OTHER PUBLICATIONS

Russian Office Action and Search Report, dated Jul. 4, 2019, for counterpart Application No. 2019105571/02, along with an English translation.

Written Opinion of the International Searching Authority for PCT/JP2017/026671 (PCT/ISA/237) dated Oct. 10, 2017.

International Search Report for PCT/JP2017/026671 (PCT/ISA/210) dated Oct. 10, 2017.

Extended European Search Report for European Application No. 17841332.4, dated Sep. 10, 2019.

* cited by examiner

DOUBLE LINE REPRESENTS RIDGELINE

DOUBLE LINE REPRESENTS RIDGELINE (a)

(b)

ously forming a top sheet, vertical walls, and outward flanges
AUTOMOBILE BODY PRESS-MOLDED COMPONENT AND METHOD FOR PRODUCING SAME

TECHNICAL FIELD

The present invention relates to an automobile body press-molded component that can enhance the strength and the rigidity of an automobile body effectively and a method for producing the same. Specifically, the present invention relates to an automobile body press-molded component having a hat-like transverse cross-sectional shape that includes a top sheet, vertical walls, flanges, and ridgelines formed between the top sheet and the vertical walls and between the vertical walls and flanges, and a method for producing the same. The automobile body press-molded component includes outward flanges that are formed on at least one end portions in the extending directions of ridgelines so as to be bent outwardly from the vertical walls with respect to a cross section of the component. The automobile body press-molded component is a press-molded component formed of a metal sheet in which outward flanges leading to the vertical walls (hereinafter, referred to as "vertical wall flanges") and flanges (hereinafter, referred to as "floor flanges") are formed continuously and the radius of curvature of a corner portion of the vertical wall adjacent to the outward flange and the floor flange (hereinafter, referred to as a vertical wall angle R) is small. A component "formed of a metal sheet" may be a component having steel sheet nature or a component made of an aluminum sheet, as an example.

BACKGROUND ART

An automobile body is usually produced such that a large number of molded panels are joined together by resistance spot welding while edge portions of panels are superimposed on each other and thus box bodies are formed, and reinforcing members or strengthening members are joined to important places of the box bodies by resistance spot welding. A member thus produced is referred to as an automobile body structural member. Examples of such an automobile body structural member include a floor cross member, a locker (a side sill), a belt line, etc. In the following description, a floor cross member is taken as an example of the automobile body structural member.

The floor cross member has a press-molded, substantially hat-like transverse cross-sectional shape composed of a top sheet, two ridgelines leading to the top sheet (hereinafter, referred to as "upper ridgelines"), two vertical walls individually leading to the two upper ridgelines, two ridgelines individually leading to the two vertical walls (hereinafter, referred to as "lower ridgelines"), and two floor flanges individually leading to the two lower ridgelines, for example. Outward flanges that are bent outwardly with respect to a cross section of the component are formed on end portions in the extending directions of the upper ridgelines and the lower ridgelines in a main body that is formed of a steel sheet and has the above transverse cross-sectional shape, the outward flanges are superimposed on a side sill inner, and then assembly is performed by resistance spot welding, arc welding, or the like. The floor cross member is an important automobile body structural member contributing to the rigidity of the car body and the suppression of the crushing of the cabin at the time of a lateral collision. Hence, until now, a large number of inventions that enhance the strength of a car body by reexamining the shapes of members and the structures of bonding portions between members and a large number of inventions regarding methods for producing members have been disclosed.

Patent Literature 1 discloses an invention in which the performance of a member is enhanced by continuously forming a top sheet, vertical walls, and outward flanges adjacent to upper ridgelines that are provided in an end portion in the longitudinal direction of a press-molded product having a hat-like cross section. Patent Literature 2 discloses an invention in which the bonding strength between a side sill and a floor cross member is enhanced by providing an opening in a side surface of a side sill inner and welding together a sill inner reinforce and the floor cross member placed in the interior of the side sill. Patent Literature 3 discloses an invention in which the bonding strength between a side sill and a floor cross member is enhanced by opening a side sill inner without enlarging the transverse cross section and providing a plurality of welds for bonding with the floor cross member.

CITATION LIST

Patent Literature

Patent Literature 1: JP 2015-74354A
Patent Literature 2: JP 2996031B
Patent Literature 3: JP H2-141372A
Patent Literature 4: JP 5569661B
Patent Literature 5: JP 2560416B
Patent Literature 6: JP 2554768B
Patent Literature 7: JP H7-112219A
Patent Literature 8: JP H4-118118A

SUMMARY OF INVENTION

Technical Problem

Patent Literatures 1 to 3 are what are invented for the purpose of improving lateral collision safety. However, none of these patent literatures has an invention focusing attention on the magnitude of the vertical wall angle R. For example, Patent Literature 1 shows, in its drawings, a member having a large vertical wall angle R in which the portion between a vertical wall flange and a floor flange is formed in a gently continuous manner. On the other hand, in Patent Literature 2, the vertical wall angle R is relatively small unlike what is shown in the drawings of Patent Literature 1. In Patent Literature 3, the situation of the vicinity of the vertical wall angle R is unclear. Further, none of these patent Literatures describes the dimensions of the vertical wall angle R in detail. Thus, little attention has been focused on and no detailed studies have been conducted on the influence of the vertical wall angle R on the performance of the member.

Solution to Problem

The present inventors conducted extensive studies in order to solve the issue mentioned above in view of such issues of the conventional technologies and have obtained findings A to D listed below, and have completed the present invention.

(A) The length of a cross-sectional line in an end portion of a member is increased by reducing the magnitude (the radius of curvature) of the vertical wall angle R. Thus, the performance (load capacity properties) of the member is improved in an axial crushing deformation mode, such as one inputted to a floor cross member at the time of a lateral collision.

(B) Specifically in (A), it is preferable that a dimension of the vertical wall angle R be set to less than or equal to 13% relative to the length of the cross-sectional line in an end portion of the member.

(C) The areas of the vertical wall flange and the floor flange increase in association with the reduction of the vertical wall angle R. Thus, the number of welds of spot welding or the length of the weld of arc welding or laser welding can be increased at the time of bonding to another member, and an improvement in the performance of the car body, such as the efficiency of bonding between members or rigidity, is achieved.

(D) A gap that may occur during bonding to another member can be filled up by the reduction of the vertical wall angle R. An improvement in the performance of the car body, such as the efficiency of bonding between members or rigidity, is achieved.

(E) The performance of the member can be further enhanced by, in addition to reducing the vertical wall angle R, continuously forming the top sheet, the vertical walls, and the outward flanges adjacent to the upper ridgelines that are provided in an end portion in the longitudinal direction of the press-molded product of a hat-like cross section.

The present invention is as listed below.

(1)

A member including:

a top sheet;

two facing vertical walls provided on both sides of the top sheet via upper ridgelines;

a top sheet flange extending on an outside of the member via a top sheet ridgeline of the top sheet existing on a side of an end portion of the member;

two vertical wall flanges each extending on the outside of the member via a vertical wall ridgeline of the vertical wall extending on the side of the end portion of the member; and two floor flanges each of which is adjacent to the vertical wall flange and extends on the outside of the member via a lower ridgeline that extends on an end portion of the vertical wall different from an end portion of the vertical wall on the side of the end portion of the member, in which the vertical wall flange and the floor flange adjacent to an end portion of the vertical wall flange are continuous with each other, and in the end portion of the member, a sum total $\Sigma R$ of radii of curvature of angles of the vertical walls each between the lower ridgeline and the vertical wall ridgeline and a sum total $\Sigma L$ of widths of the top sheet and the vertical walls in the end portion of the member have a relation of $\Sigma R/\Sigma L \leq 0.13$.

(2)

The member according to claim 1, in which the radius of curvature of the angle of the vertical wall between the lower ridgeline and the vertical wall ridgeline is less than or equal to 20 mm.

(3)

The member according to claim 1 or 2, in which the top sheet flange and the vertical wall flange are continuous.

(4)

The member according to any one of claims 1 to 3, in which the vertical wall is a triangle, and the floor flange serves also as the vertical wall flange.

(5)

A method, based on press molding, for producing a press-molded product, the method being for producing the member according to any one of claims 1 to 4, the method including:

a first step of molding, in a shrink flange manner, at least parts of floor flanges and parts of vertical wall flanges continuous to the floor flanges, in at least two places of a blank; and a second step of, following the first step, molding, in a stretch flange manner, a top sheet flange and remaining parts of the vertical wall flanges continuous to the top sheet flange, in at least two places between the at least two places of the blank in the first step.

An object of the present invention is to provide a member like the floor cross member of FIG. 1. However, the member dealt with by the present invention is not limited to a floor cross member, and the vertical wall is not limited to a quadrangle either. For example, as shown in FIG. 2, a press-molded product in which the vertical wall is a triangle is possible.

However, when it is attempted to produce the member by press molding, the portion between the vertical wall flange and the floor flange forms a shrink flange portion, and therefore wrinkles resulting from surplus wall thicknesses occur. For example, Patent Literature 4 describes a method for producing a member disclosed in Patent Literature 1; however, when a shrink flange portion between a vertical wall flange and a floor flange is press-molded using Patent Literature 4, wrinkles resulting from surplus wall thicknesses occur because tension cannot be applied to the steel sheet during press molding. Consequently, it has been necessary that the occurrence of wrinkles be reduced by providing a notch between the vertical wall flange and the floor flange or by setting the vertical wall angle R as large as, for example, 30 mm. Thus, even when the floor cross member is joined to a side sill inner via the vertical wall flanges as described above, the load capacity properties at the time of axial crushing upon a collision or the like is relatively low because the notch mentioned above or a gap caused by the large vertical wall angle R exists unavoidably in the vicinity of a joint portion between the floor cross member and the side sill. Hence, when forming an outward flange, it is necessary to perform the molding of a shrink flange portion while suppressing the occurrence of wrinkles in the shrink flange portion. Until now, a large number of inventions in which a shrink flange portion is press-molded without wrinkles have been disclosed. For example, Patent Literature 5 discloses an invention in which the occurrence of wrinkles is prevented by providing a specific shape to a shrink flange portion in square cup drawing molding, Patent Literatures 6 and 7 disclose inventions in which a shape for absorbing an excessive line length in a shrink flange portion is provided to a roof panel having an opening for a sunroof, and Patent Literature 8 discloses an invention in which the occurrence of wrinkles is suppressed by performing molding while applying pressing force to a shrink flange portion by using a cam structure.

However, for the invention disclosed by Patent Literature 5, although it can be implemented when it does not influence the external appearance or the performance of the product, joining becomes difficult and the load transfer capacity at the time of collision deformation is reduced when the specific shape is provided to a place that is to be connected to another component (a side sill) like in, for example, a floor cross member.

The inventions disclosed by Patent Literatures 6 and 7 absorb a surplus line length, which is a cause of wrinkles and surplus wall thicknesses, by means of a surplus wall thickness shape set in advance. Hence, the inventions disclosed by Patent Literatures 6 and 7 cannot be implemented when the surplus wall thickness portion constitutes an obstacle to the spot welding of another part, not to mention when resistance spot welding is performed in this advance wall thickness portion.

Further, for the invention disclosed by Patent Literature 8, although out-of-plane deformation associated with buckling can be suppressed with reliability, there is no change to a place where shrinkage deformation concentrates and the sheet thickness increases. Hence, mold contact is severe in a place of an excessive wall thickness increase, and the durability of the mold and accordingly productivity are reduced.

Thus, in the conventional technologies, it has been impossible to perform press molding without the occurrence of wrinkles between a vertical wall flange and a floor flange, and hence a reduction in load transfer characteristics at the time of axial crushing upon a collision or the like has been unavoidable.

The present inventors conducted extensive studies in order to solve the issue mentioned above and have obtained findings (A) to (C) listed below, and have completed the present invention.

(A) In a first step, shrink flange molding is performed on a blank under arbitrary constraint conditions and linkage portions each between a vertical wall flange and a floor flange are molded, and an intermediate molded product is obtained.

(B) In a second step, press molding is performed on the intermediate molded product in which the linkage portions each between a vertical wall flange and a floor flange are molded, and a press-molded component having a desired transverse cross-sectional shape that includes a top sheet, vertical walls, and flanges is obtained.

(C) A shape in which a top sheet, vertical walls, and outward flanges adjacent to upper ridgelines are continuous can be created by using inner pad molding described later in the second step.

The present invention is as listed below.

(1) A method for producing a press-molded component including a first step of performing press molding on a blank to form the lower flange linkage portions mentioned above in a shrink flange manner and thereby producing an intermediate molded product having at least the lower flange linkage portions mentioned above and a second step of performing press molding on the intermediate molded product to produce the press-molded component mentioned above having the transverse cross section mentioned above.

Advantageous Effects of Invention

The present invention can provide a member that exhibits high load capacity in a joint portion when the member is used by being joined to another member and has received a collision load. Further, the present invention can provide a method for producing the member by press molding.

DESCRIPTION OF EMBODIMENTS

Figure 1:
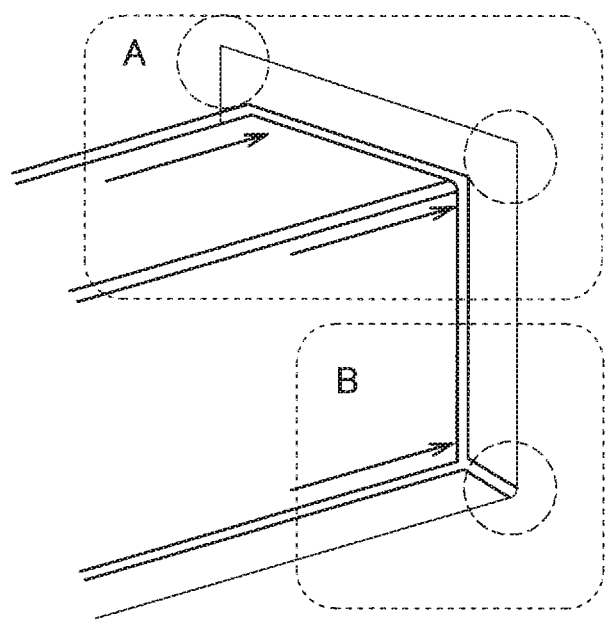
FIG. 1 is an explanatory diagram of an end portion of a member.
Figure 2:
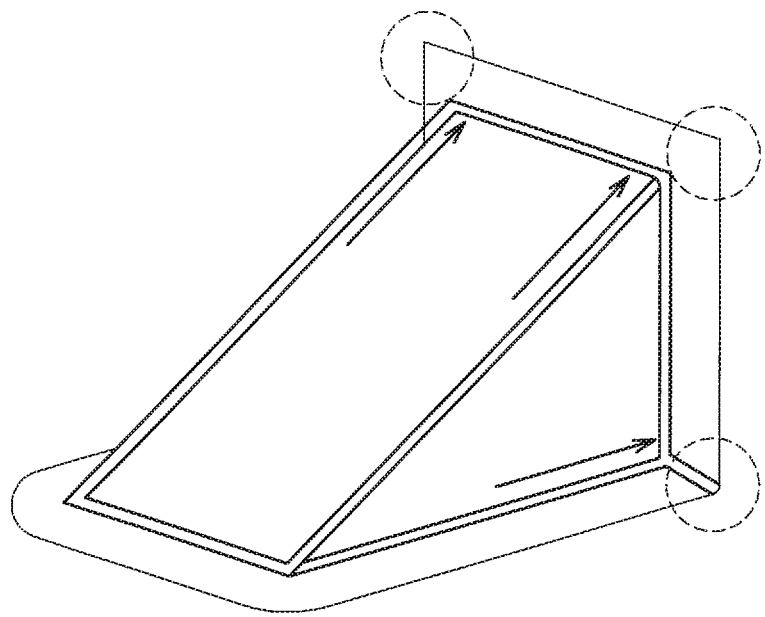
FIG. 2 is an explanatory diagram of a different member.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

1. Member According to Present Invention
(1) Shape of Member

Figure 3:
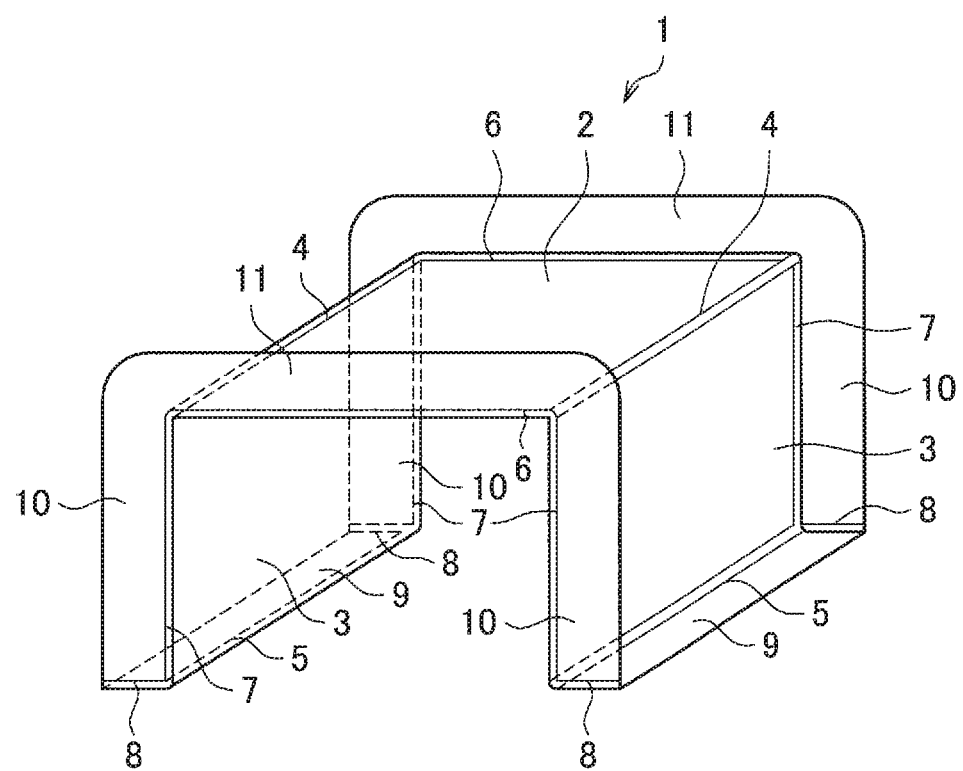
FIG. 3 is an explanatory diagram showing a member according to the present invention.
Figure 4:
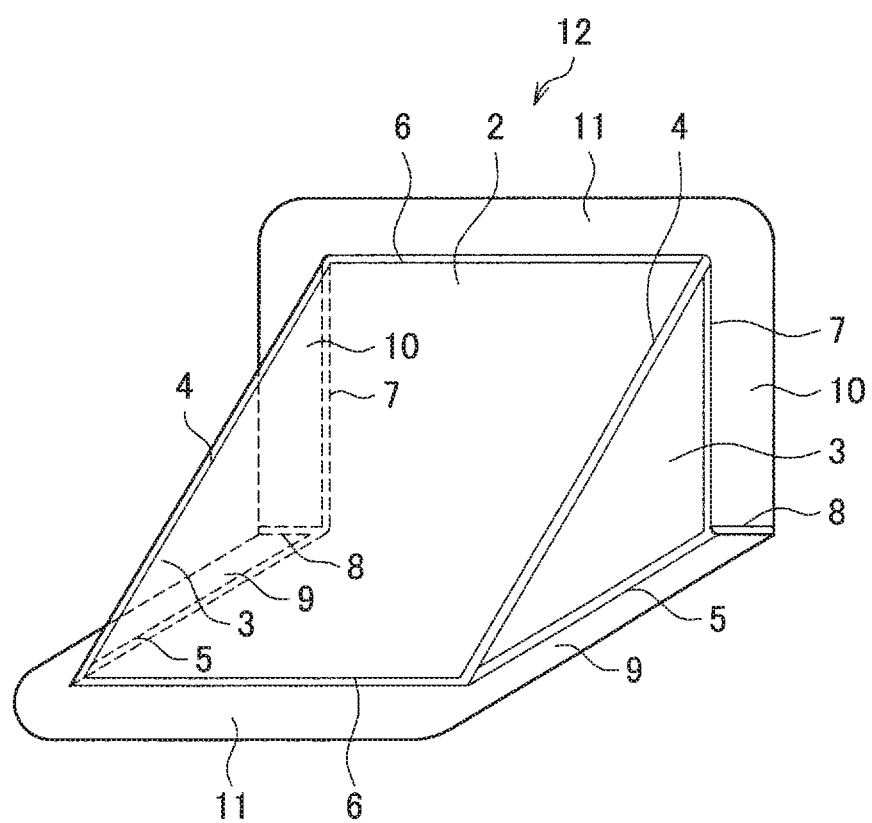
FIG. 4 is an explanatory diagram showing another member according to the present invention.

FIG. 3 is an explanatory diagram showing a member 1 according to the present invention, and FIG. 4 is an explanatory diagram showing another member 12 according to the present invention. In the drawings, the single line represents an edge of the member, the double line a ridgeline, and the dotted line a place hidden behind the member.

The member 1 of FIG. 3 is a member formed of a high-tensile steel sheet in which the tensile strength is more than or equal to 440 MPa, preferably more than or equal to 590 MPa, and more preferably more than or equal to 980 MPa, and the sheet thickness is more than or equal to 0.7 mm and less than or equal to 2.3 mm.

The member 1 of FIG. 3 has a hat-like transverse cross section that includes a top sheet 2, two upper ridgelines 4, two facing vertical walls 3, two lower ridgelines 5, and two floor flanges 9.

Each of the upper ridgelines 4 exists between the top sheet 2 and a vertical wall 3. Each of the lower ridgelines 5 exists between a vertical wall 3 and a floor flange 9.

The member 1 includes outward flanges on at least one end portions of the upper ridgelines 4 via ridgelines. A top sheet flange 11 extends on the outside of the member via a top sheet ridgeline 6 extending between end portions of the upper ridgelines 4. Each of vertical wall flanges 10 extends on the outside of the member via a vertical wall ridgeline 7 that is adjacent to the top sheet ridgeline 6 and extends on an end portion of a vertical wall 3. The top sheet flange 11 and the vertical wall flanges 10 are continuous, and the top sheet flange 11 and the vertical wall flanges 10 constitute an outward flange.

Also an end portion of the vertical wall flange 10 and the floor flange 9 are continuous via a flange ridgeline 8; and an end portion of the vertical wall ridgeline 7, an end portion of the lower ridgeline 5, and an end portion of the flange ridgeline 8 are linked together at one point.

The top sheet flange 11 and the vertical wall flanges 10 may not be continuous on end portions of the upper ridgelines 4. However, the performance of the member is improved when the top sheet flange 11 and the vertical wall flanges 10 are continuous on end portions of the upper ridgelines 4. In the case where the top sheet flange 11 and the vertical wall flanges 10 are made continuous, the degree of difficulty in molding is increased, and hence attention is required to the selection of the material, the width of the flange, etc.

The point of difference between the member 12 of FIG. 4 and the member 1 of FIG. 3 is that, in the member 12, the vertical wall 3 is a triangle, and the upper ridgeline 4 and an end portion of the lower ridgeline 5 are linked together at another end portion of the upper ridgeline 4 where there is no vertical wall flange 10. As a result, the top sheet flange 11 and the floor flange 9 are continuous at this other end portion. From another point of view, since the vertical wall 3 is a triangle, both functions of the floor flange 9 and the vertical wall flange 10 are present at this other end portion. In the present embodiment, even in the case where the vertical wall 3 is a triangle, also a configuration in which the top sheet flange 11 is not continuous with the floor flange 9 or the vertical wall flange 10 is permitted, like in the case of FIG. 3 where the vertical wall is a quadrangle. "The vertical wall 3 being a triangle" means that the vertical wall 3 includes three corner portions, i.e., a corner portion where the upper ridgeline 4 and the vertical wall ridgeline 7 cross, a corner portion where the vertical wall ridgeline 7 and the lower ridgeline 5 cross, and a corner portion where the upper ridgeline 4 and the lower ridgeline 5 cross. Shapes slightly deviated from a triangle composed of three sides of straight lines are permitted, such as a shape in which a corner portion is round or a ridgeline runs in a zigzag fashion.

Figure 5:
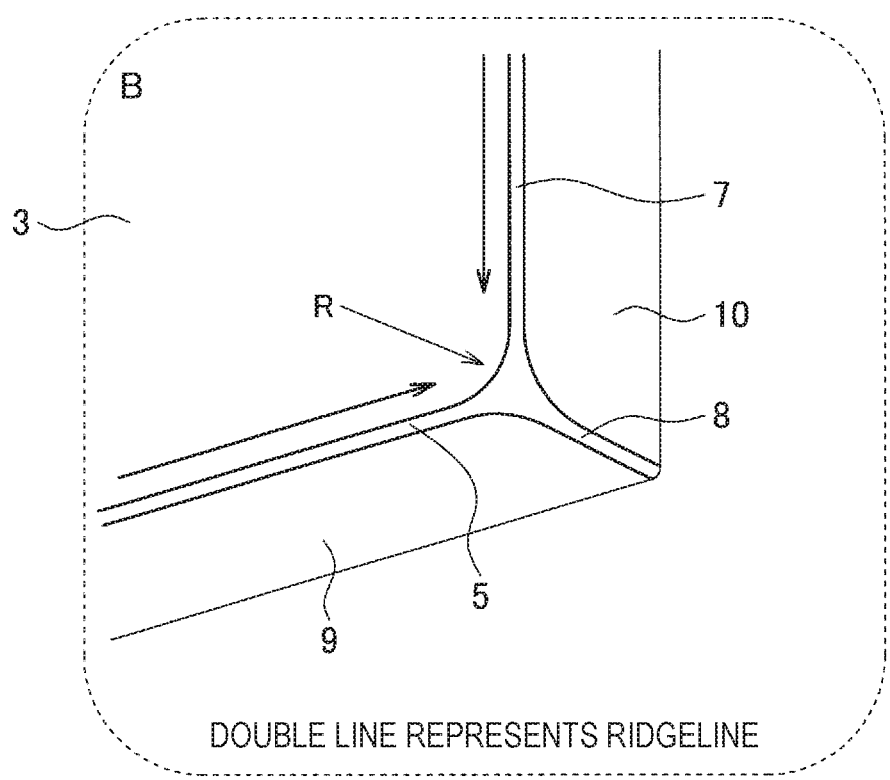
FIG. 5 is an explanatory diagram of a corner portion of a member having high strength.
Figure 6:
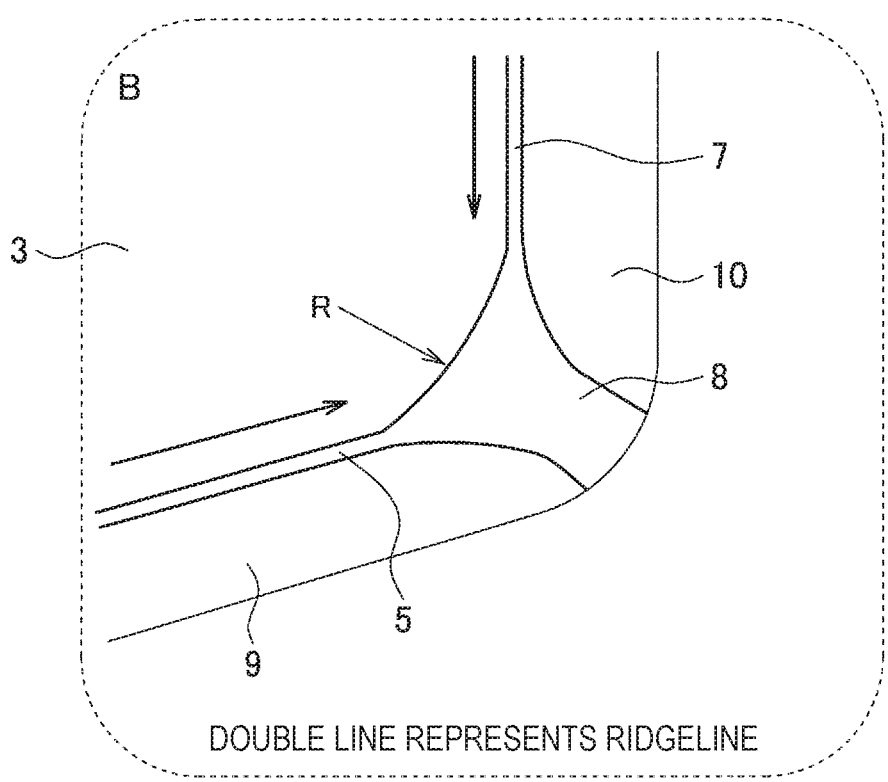
FIG. 6 is an explanatory diagram of a corner portion of a member having low strength.

FIG. 5 shows a case where the strength of the B portion of FIG. 1 is high. FIG. 6 shows a case where the strength of the B portion of FIG. 1 is low. Each of the cross sections of the ridgelines is bent between double lines in the drawings. An area where the radius of curvature of the cross section of a ridgeline is small is indicated by an arrow. When FIG. 5 and FIG. 6 are compared, it can be seen that the radius of curvature R of a corner portion of the vertical wall 3 between the lower ridgeline 5 and the vertical wall ridgeline 7 is increased if end portions of the lower ridgeline 5 and the vertical wall ridgeline 7 are dull (the radii of curvature of the bending of the cross sections of the ridgelines are large). If end portions of the lower ridgeline 5 and the vertical wall ridgeline 7 are dull, that is, the radii of curvature R are large, the strengths of the end portion of the lower ridgeline 7 and the end portion of the vertical wall ridgeline 5 are reduced, and the vertical wall flange 10 and the floor flange 9 cannot be joined to another member up to the vicinity of the flange ridgeline 8; consequently, the load capacity and the rigidity of the member are reduced.

In the member of the present invention, the sum total $\Sigma R$ of the radii of curvature of corner portions of the vertical walls 3 each between the lower ridgeline 5 and the vertical wall ridgeline 7 (vertical wall angles R) and the sum total $\Sigma L$ of the lengths of the top sheet ridgeline 6 of the top sheet 2 and the vertical wall ridgelines 7 of the vertical walls 3 in an end portion of the member have the relation of $\Sigma R/\Sigma L \leq 0.13$. The sum total of the widths of the top sheet 2 and the vertical walls 3 in an end portion of the member is the length on the assumption that each of the angles of the vertical walls 3 and the top sheet 2 in the end portion is a pin angle (the radius of curvature being 0).

When it is envisaged that the member of the present invention is used as an automotive member, the $\Sigma L$ of the automotive member is approximately 300 mm, and accordingly the radius of curvature of the angle of the vertical wall 3 between the lower ridgeline 5 and the vertical wall ridgeline 7 (the vertical wall angle R) is approximately less than or equal to 20 mm.

(2) Effects of Member

Figure 7:
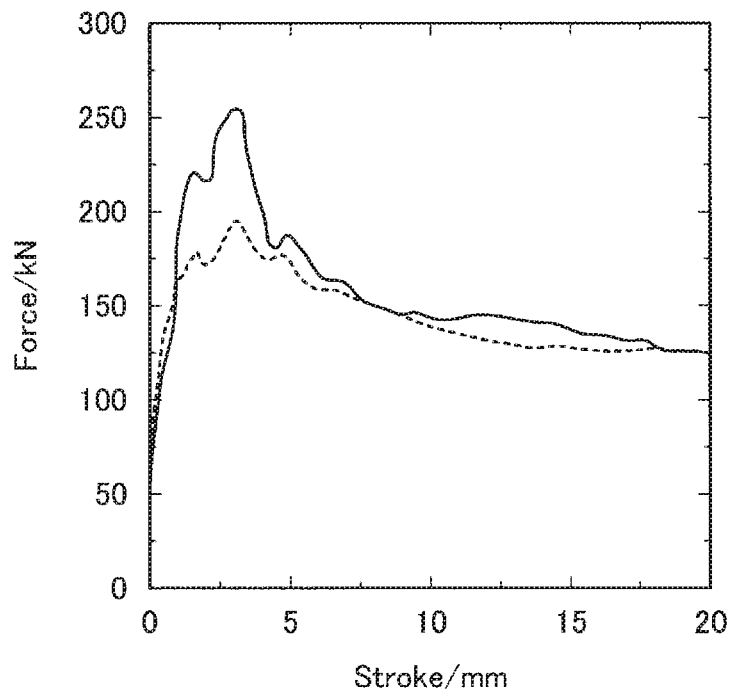
FIG. 7(a) and FIG. 7(b) are graphs showing results of an analysis by computer simulation of influence of a radius of curvature R (mm) of a corner portion between a lower ridgeline and a vertical wall ridgeline on axial crushing characteristics in an event in which an impact load is applied in an extending direction of upper ridgelines and thereby axial crushing is brought about in a state where a member is joined to another member via outward flanges.
Figure 7:
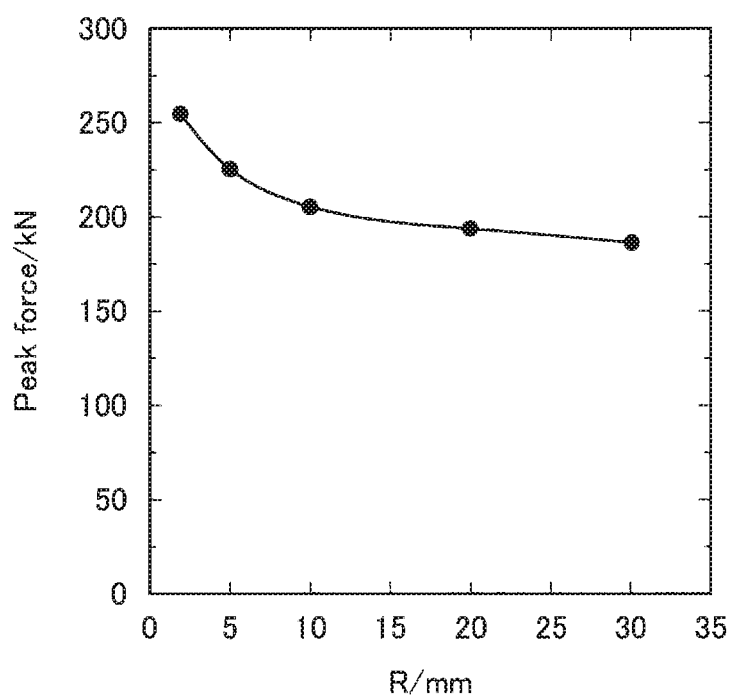

FIG. 7(a) and FIG. 7(b) are graphs showing results of an analysis of the axial crushing characteristics of the member 1 by computer simulation. The analysis was performed with a model in which an impact load in the direction in which the upper ridgelines 4 extend was applied in a state where the member 1 was joined to another member (a side sill inner) via outward flanges (the vertical wall flanges 10 and the top sheet flange 11). FIG. 7(a) and FIG. 7(b) show the influence of the radius of curvature R of a corner portion of the vertical wall 3 between the lower ridgeline 5 and the vertical wall ridgeline 7 (the vertical wall angle R) (mm) on axial crushing characteristics at the time of axial crushing. FIG. 7(a) shows relationships between the crushing stroke in the extending direction of the upper ridgelines 4 and the load in the cases where the radius of curvature R is 2 mm and 20 mm. In FIG. 7(a), the solid line shows the case where the radius of curvature R is 2 mm, and the broken line shows the case where the radius of curvature R is 20 mm. FIG. 7(b) shows a relationship between the radius of curvature R and the maximum load (load capacity). In the cross-sectional shape of the member 1, the sum total ΣL of the widths of the top sheet 2 and the vertical walls 3 in an end portion of the member is 300 mm. The material was simulated using a steel sheet with a tensile strength of 980 MPa and a sheet thickness of 1.2 mm. Since attention is focused only on the influence of the radius of curvature R of the corner portion of the vertical wall 3 between the lower ridgeline 5 and the vertical wall ridgeline 7 (the vertical wall angle R), each of the other angles of the top sheet 2 and the vertical walls 3 is simulated using a pin angle (the radius of curvature of the angle being 0).

As shown by the graph of FIG. 7(a), it can be seen that, when the radius of curvature R is smaller, the load particularly in an early period of the collision is larger; further, as shown by the graph of FIG. 7(b), the maximum load (load capacity) becomes higher as the radius of curvature R becomes smaller. Thus, the member 1 can improve load transfer characteristics (collision performance) at the time of axial crushing upon a collision or the like as the radius of curvature R of the corner portion of the vertical wall 3 between the lower ridgeline 5 and the vertical wall ridgeline 7 (the vertical wall angle R) (mm) becomes smaller.

Figure 8:
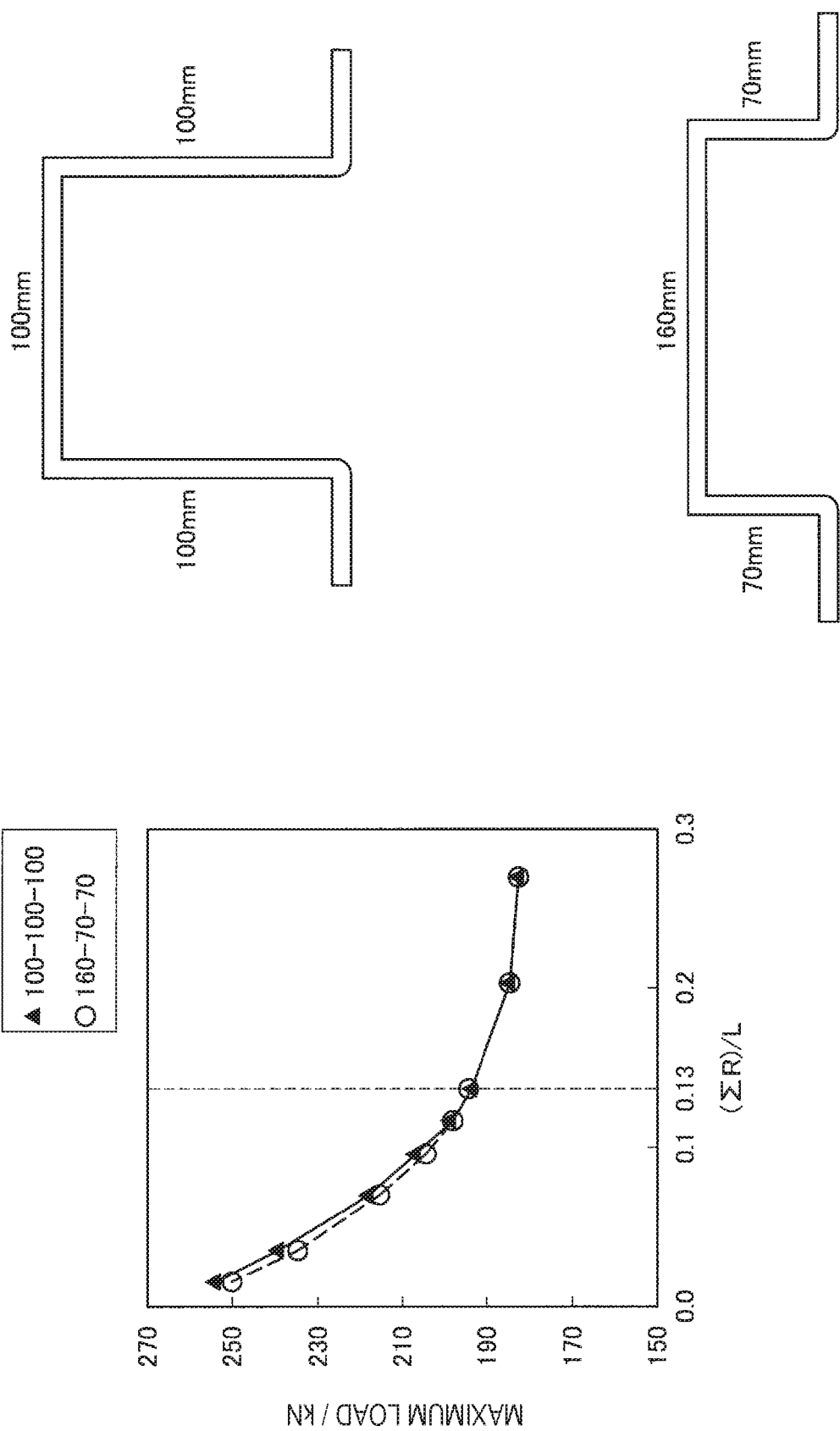
FIG. 8 is an explanatory diagram showing an analysis result.

FIG. 8 shows a comparison of load capacity (the maximum load) when the height of the vertical wall 3 and the width of the top sheet 2 of the member 1 of FIG. 3 were altered. In both cases, the sum total ΣL of the widths of the top sheet 2 and the vertical walls 3 in an end portion of the member is 300 mm. FIG. 8 is the result of an analysis in which a case where an impact load was inputted to a member 1 formed of a material with a tensile strength of 980 MPa and a sheet thickness of 1.2 mm in the direction in which the upper ridgelines 4 extend was simulated. For ΣR/ΣL on the horizontal axis of the graph of FIG. 8, the radius of curvature R of the corner portion of the vertical wall 3 between the vertical wall ridgeline 7 and the lower ridgeline 5 (the vertical wall angle R) was altered. The lengths of the vertical wall ridgeline 7 and the top sheet ridgeline 6 were altered while the sum total ΣL of the lengths of the vertical wall ridgelines 7 and the top sheet ridgeline 6 was kept fixed, but a change was not seen in terms of the load capacity being improved in ΣR/ΣL≤0.13.

Figure 9:
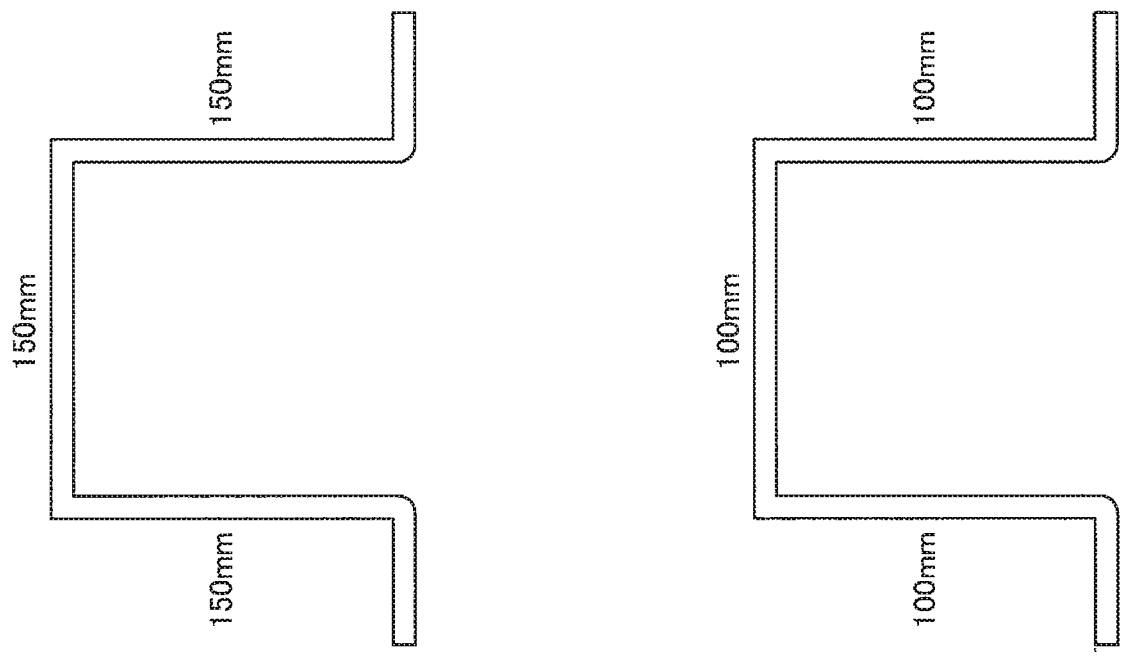
FIG. 9 is an explanatory diagram showing an analysis result.
Figure 9:
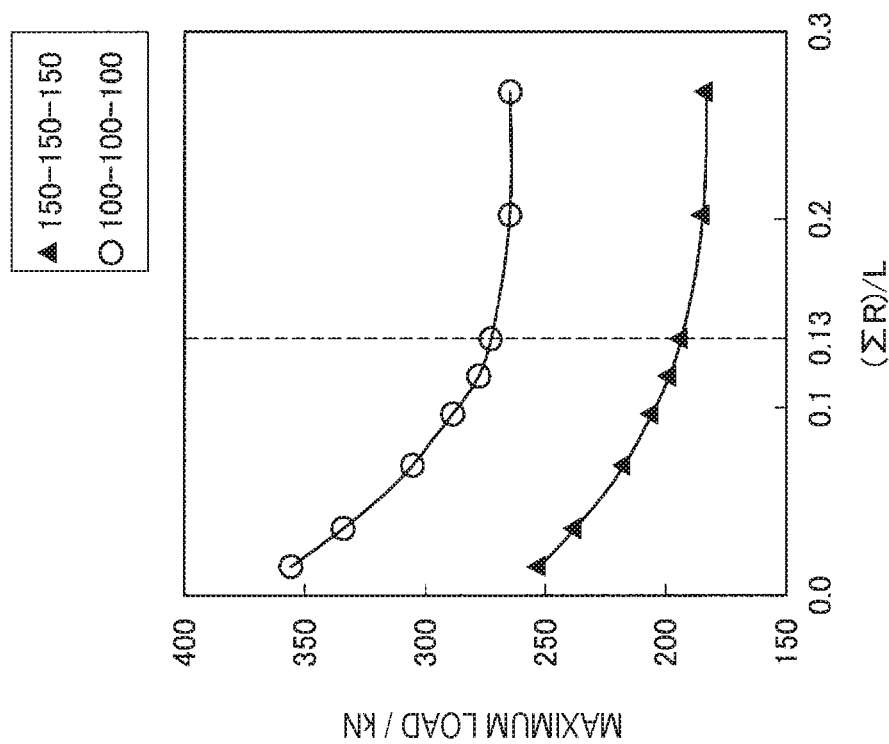

FIG. 9 shows a comparison of load capacity (the maximum load) when the length of the cross-sectional line was altered without changing the ratio between the lengths of the vertical wall ridgeline 7 and the top sheet ridgeline 6 of the member 1 of FIG. 3. In FIG. 9, the height of the vertical wall 3 and the width of the top sheet 2 are equal. The conditions of the analysis of FIG. 9 are the same as those of FIG. 8. The length of the cross-sectional line was altered without changing the ratio between the width of the top sheet 2 and the width of the vertical wall 3 in an end portion of the member, but a change was not seen in terms of the load capacity being improved in ΣR/ΣL≤0.13.

Figure 10:
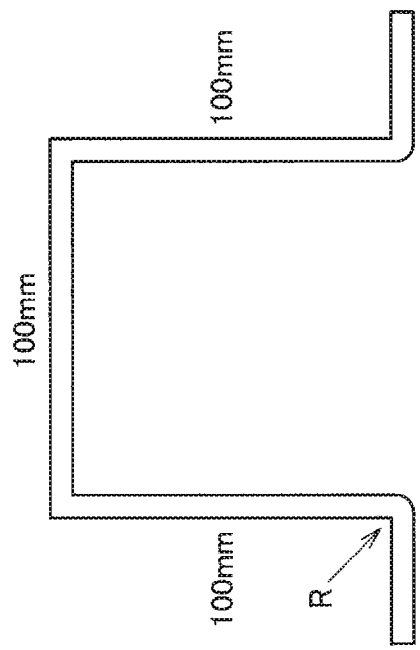
FIG. 10 is an explanatory diagram showing an analysis result.
Figure 10:
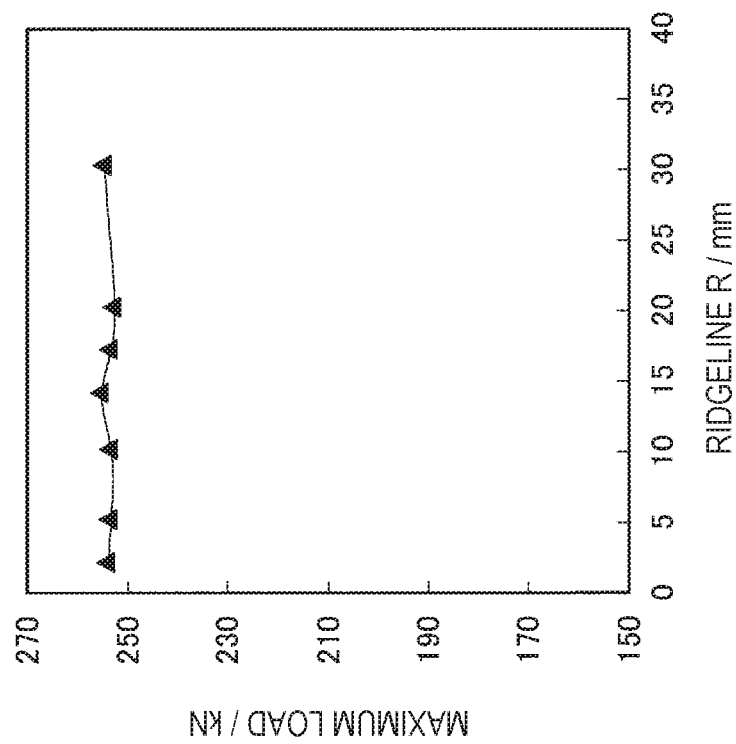

FIG. 10 shows the result of an analysis in which the radii of curvature R of the corner portions of the vertical walls 3 each between the vertical wall ridgeline 7 and the lower ridgeline 5 of the member 1 of FIG. 3 (the vertical wall angles R) were altered. In the model of the analysis of FIG. 10, the radii of curvature R of the corner portions of the vertical walls 3 each between the vertical wall ridgeline 7 and the lower ridgeline 5 (the vertical wall angles R) were altered while the sum total ΣL of the widths of the top sheet 2 and the vertical walls 3 in an end portion of the member 1 was kept to be 300 mm and ΣR/ΣL was kept to be 0.13. That is, the radius of curvature of one vertical wall angle R was altered while the sum of the one vertical wall angle R and the other vertical wall angle R was kept fixed. The conditions of the analysis of FIG. 10 are the same as those of FIG. 8. The horizontal axis of the graph of FIG. 10 represents the radius of curvature R of the corner portion of a vertical wall 3 between a vertical wall ridgeline 7 and a lower ridgeline 5 (a vertical wall angle R). When ΣR/ΣL is fixed, a large change was not seen in load capacity even when the radii of curvature of the angles of the vertical walls 3 were changed.

From the results of FIG. 8, FIG. 9, and FIG. 10, it can be seen that the member 1 has high load capacity (maximum load) in the case where ΣR/ΣL≤0.13, regardless of the transverse cross-sectional shape of the member 1.

Figure 11:
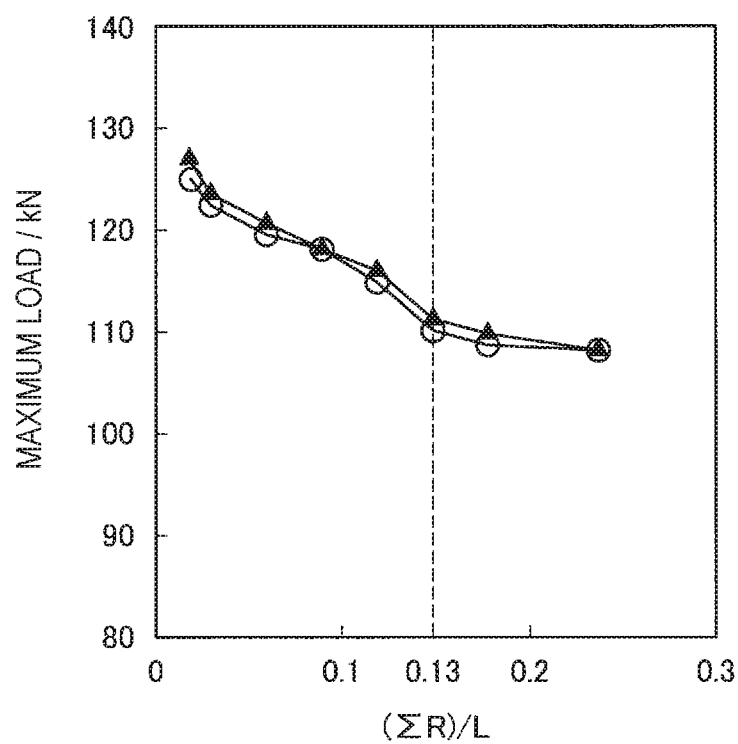
FIG. 11 is an explanatory diagram showing an analysis result.
Figure 12:
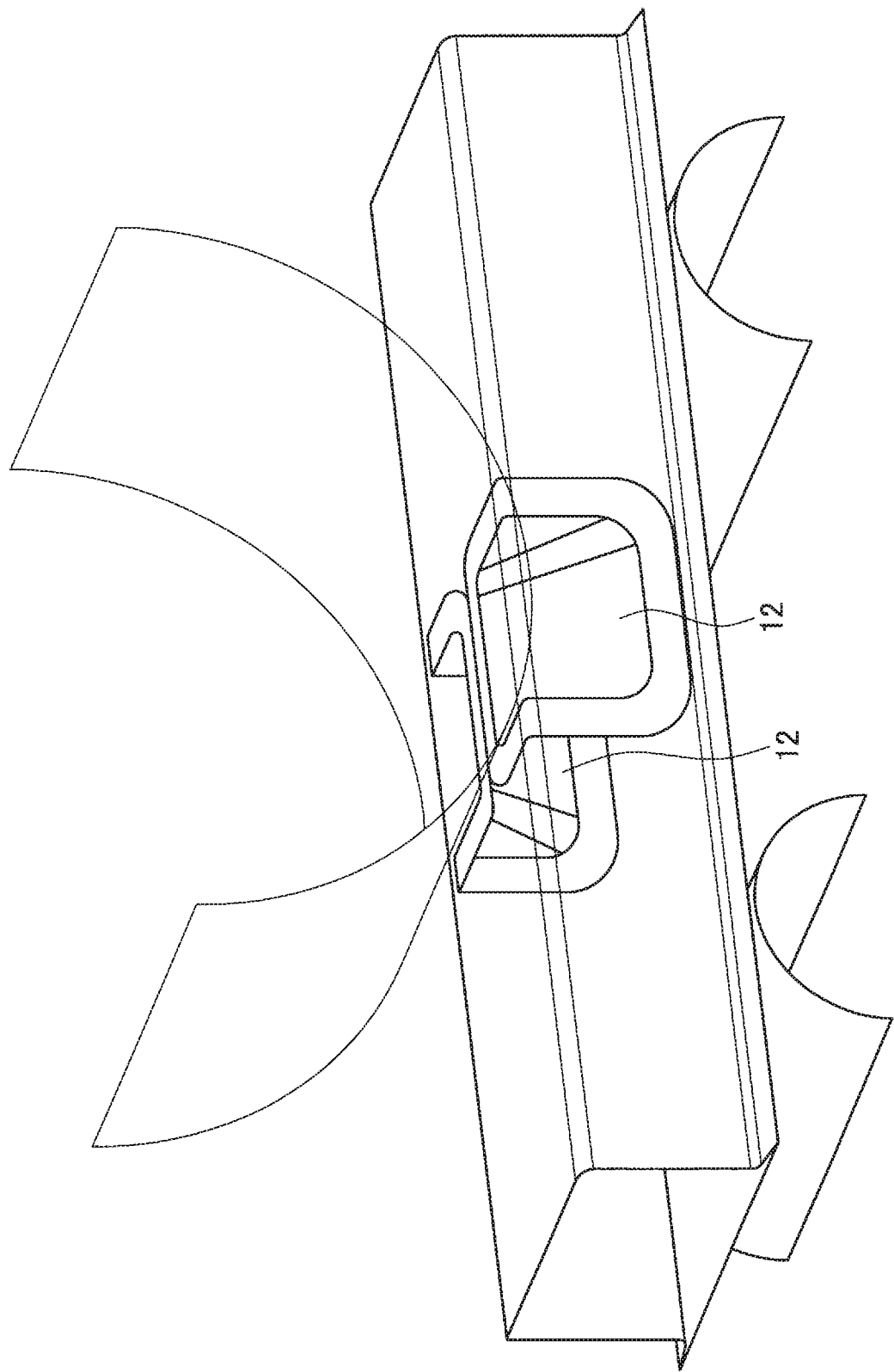
FIG. 12 is an explanatory diagram of an impact test.

FIG. 11 shows a comparison of the maximum load when the width of the vertical wall 3 and the width of the top sheet 2 in an end portion of the member 12 of FIG. 4 were altered. In both cases, the length of the cross-sectional line L is 300 mm. The material of the member 12 is the same as the material of the analysis of FIG. 8. In the analysis, a case where, as shown in FIG. 12, the member 12 was placed in a hat-shaped material and an impact load was inputted from the top sheet surface of the hat-shaped material was simulated. Thus, a result in which the load capacity was improved in ΣR/ΣL≤0.13 was obtained similarly to FIG. 8.

For the member 12 of FIG. 4, the analysis of FIG. 12 was performed also on models corresponding to FIG. 9 and FIG. 10; then, results similar to the results of the member 1 were obtained. That is, in the member 1 of FIG. 3 and the member 12 of FIG. 4, high load capacity (maximum load) is exhibited in the case where ΣR/ΣL≤0.13, regardless of the shape of the flange 11 (the width of the vertical wall 3, the width of the top sheet 2, or the vertical wall angle R in an end portion of the member).

Although the shapes are different, the member 1 of FIG. 3 and the member 12 of FIG. 4 have a common feature of exhibiting high load capacity (maximum load) in the case where ΣR/ΣL≤0.13.

2. Production Apparatus and Production Method for Members 1 and 12

Figure 13:
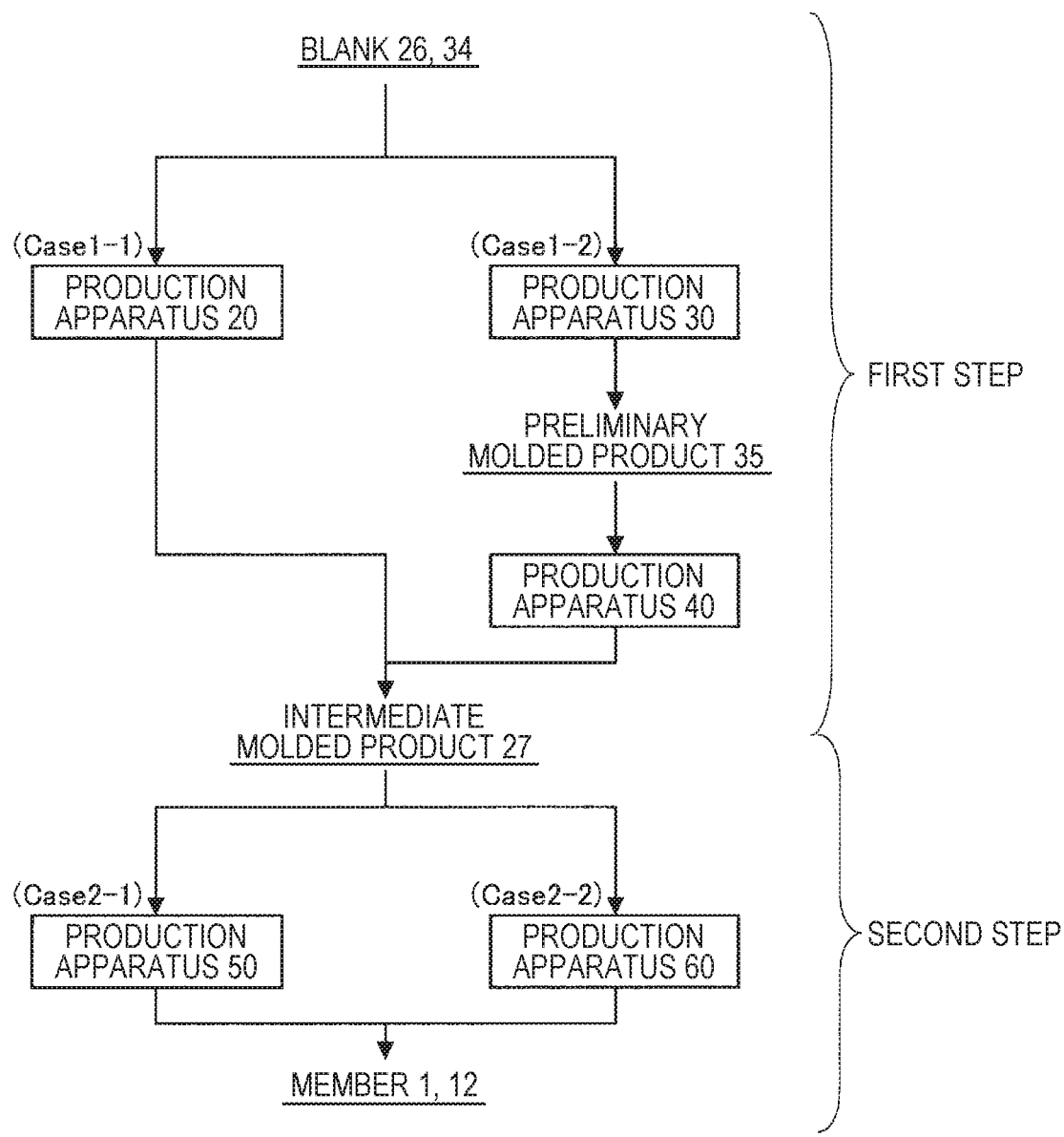
FIG. 13 is an explanatory diagram of a production process based on press molding.

In the case where a member of the present invention (the member 1 or the member 12) is produced by press molding, the production may be performed by two steps. A first step molds, in a shrink flange manner, the floor flanges 9 and parts of the vertical wall flanges 10 that are continuous to the respective floor flanges 9 via the respective flange ridgelines 8. A second step is performed following the first step, and molds the top sheet flange 11 and the remaining parts of the vertical wall flanges 10 that were not molded in the first step and that are continuous to the top sheet flange 11. FIG. 13 shows a sequence of steps in the case where a member of the present invention is produced by press molding. In the first step, an intermediate molded product 27 is produced from a blank 26 or 34. Examples of the production method include Case 1-1 where a production apparatus 20 is used and Case 1-2 where a production apparatus 30 is used to produce a preliminary molded product 35 and a production apparatus 40 is used to produce an intermediate molded product 27 from the preliminary molded product 35, and either method is possible. In the second step, the member 1 or the member 12 is produced from the intermediate molded product 27. Examples of the production method include Case 2-1 where a production apparatus 50 is used and Case 2-2 where a production apparatus 60 is used, and either method is possible.

(1) Case 1-1 (First Step; Production Apparatus 20)

An apparatus 20 performs press molding on a blank 26 to form, in a shrink flange manner, the floor flanges 9 and parts of the vertical wall flanges 10 that are continuous to the respective floor flanges 9 via the respective flange ridgelines 8, and produces an intermediate molded product 27.

Figure 14:
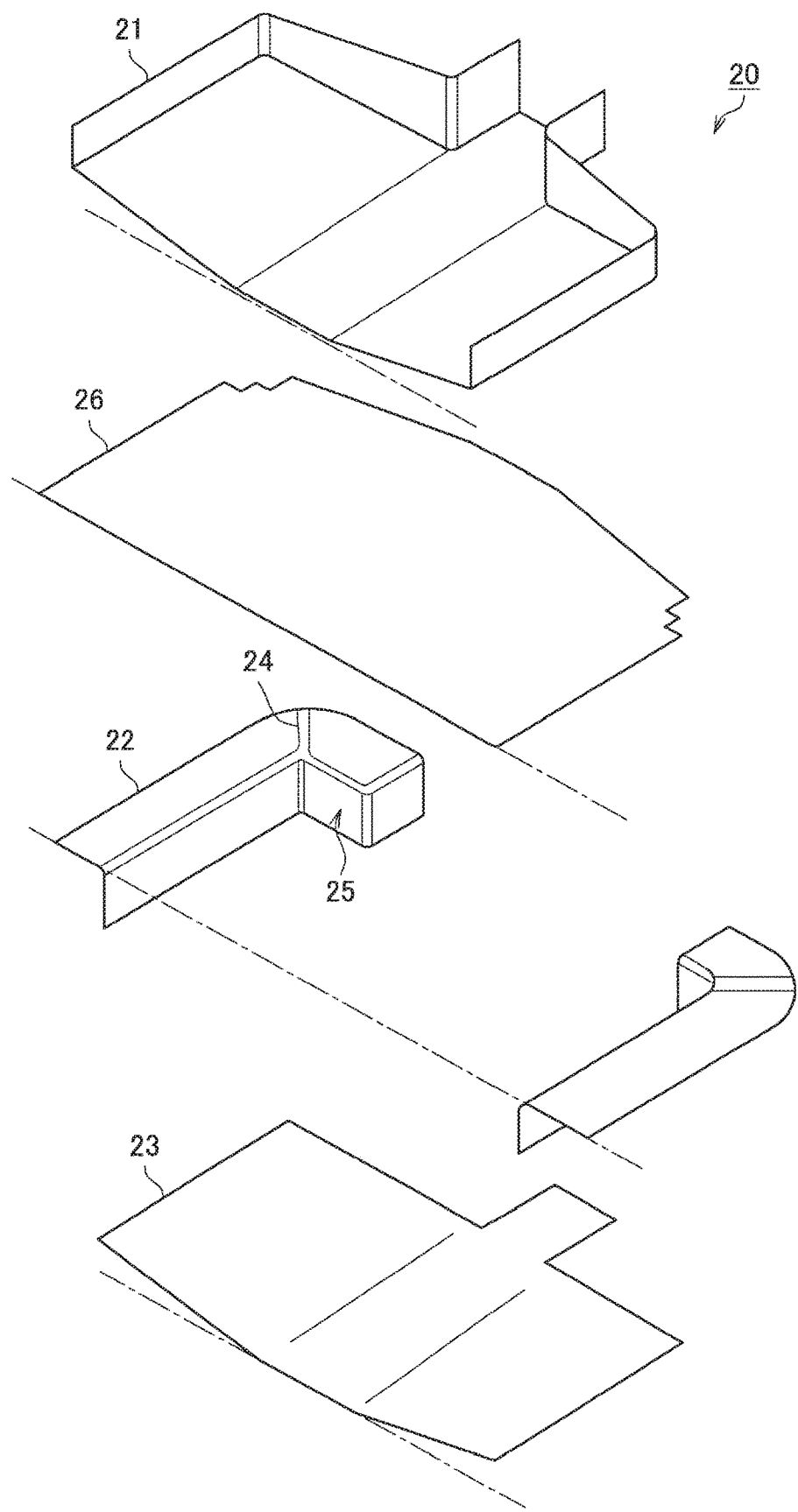
FIG. 14 is an explanatory diagram showing a production apparatus 20.
Figure 15:
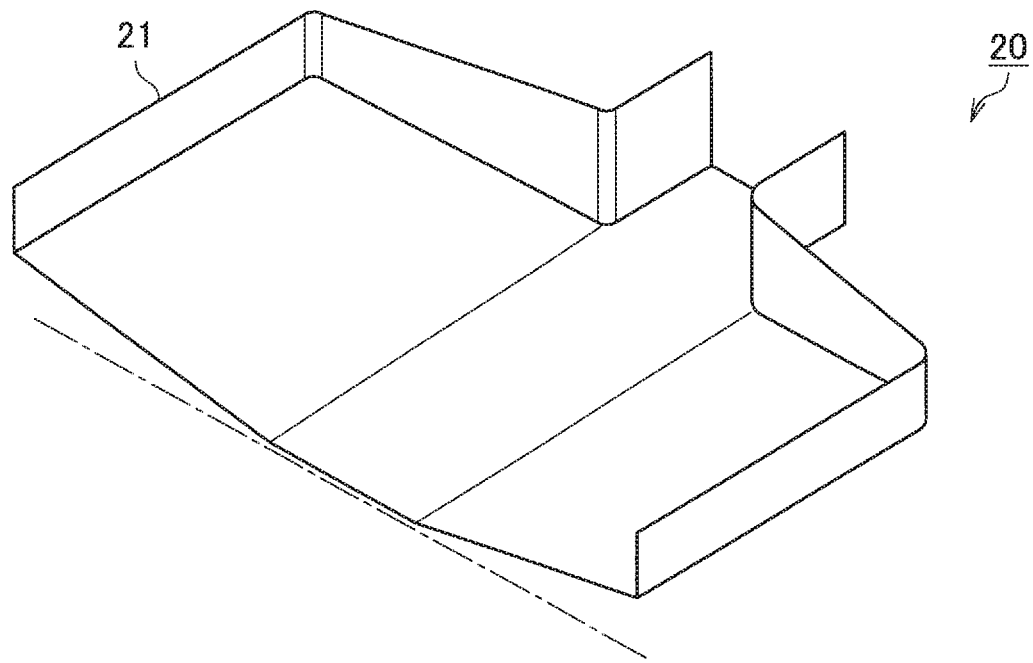
FIG. 15 is an explanatory diagram showing placement of a blank before a start of molding in the production apparatus 20.
Figure 15:
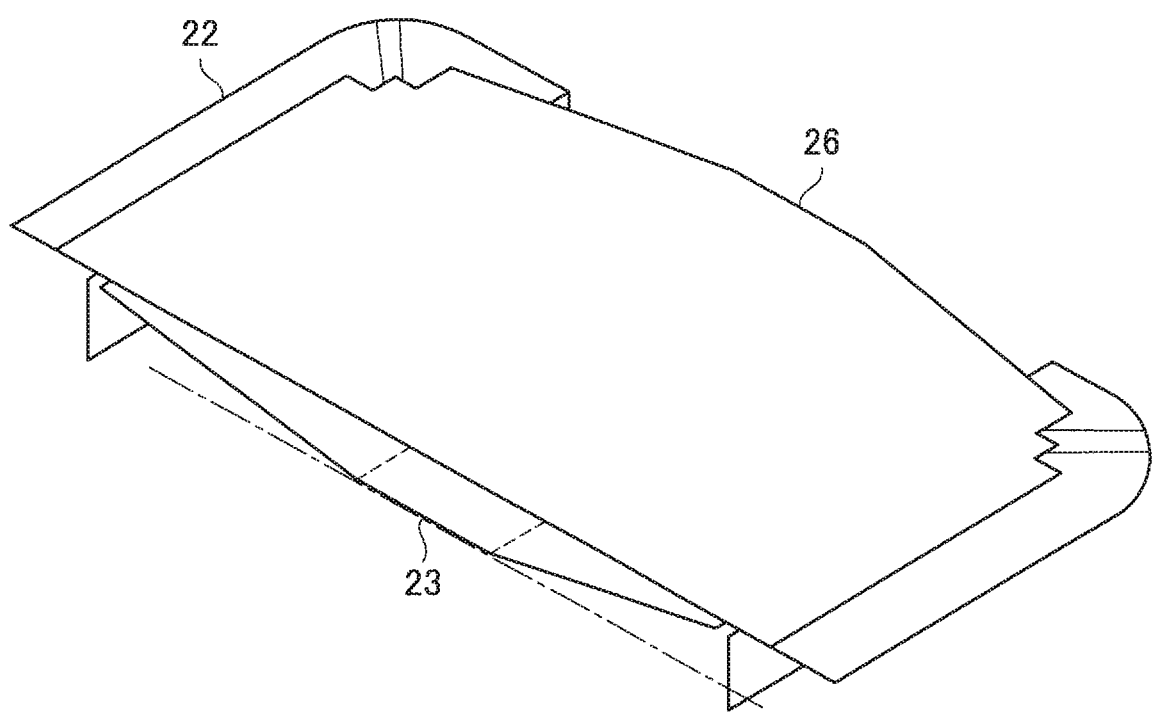
Figure 16:
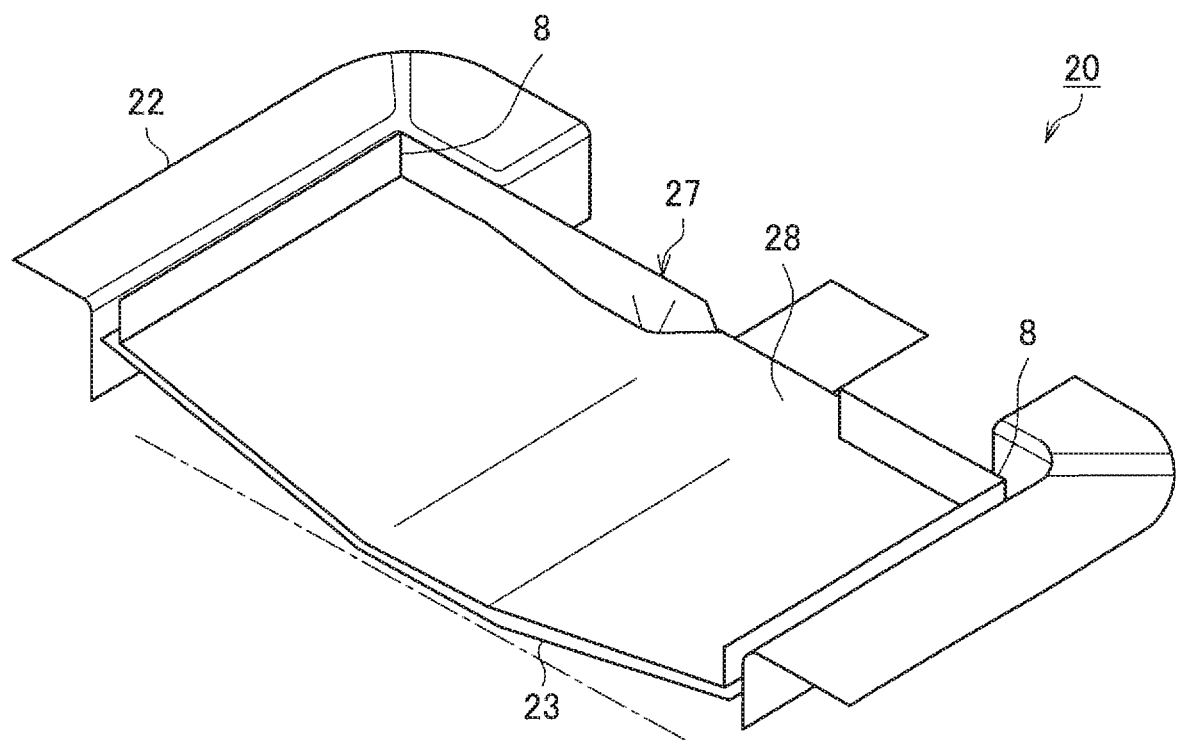
FIG. 16 is an explanatory diagram showing a situation of a molding bottom dead center of the production apparatus 20.

FIG. 14 is an explanatory diagram showing the production apparatus 20. FIG. 15 is an explanatory diagram showing the placement of the blank 26 before the start of molding in the production apparatus 20. FIG. 16 is an explanatory diagram showing a situation of the molding bottom dead center based on the production apparatus 20, in which a description of a punch 21 is omitted for easier viewing of the drawing.

As shown in FIG. 14, the production apparatus 20 includes a punch 21, protrusion-provided dies 22, and a pad 23. The protrusion-provided dies 22 are arranged facing the punch 21. The protrusion-provided die 22 integrally includes a bending tool 25 having a protrusion portion 24. The bending tool 25 may be a separate body from the die 22.

In the production apparatus 20, as shown in FIGS. 14 to 16, the protrusion portions 24 press portions of the blank 26 corresponding to the flange ridgelines 8, earlier than portions of the bending tools 25 other than the protrusion portions 24 press, and thereby perform stretch flange molding to cause the places to be molded into the flange ridgelines 8 to undergo shear deformation. Thus, the production apparatus 20 molds the blank 26 into an intermediate molded product 27 including the flange ridgelines 8. A part 28 of the intermediate molded product 27 supposed to be molded into the top sheet flange 11 may not be molded by the production apparatus 20.

Reasons why the occurrence of wrinkles is suppressed in the flange ridgeline 8 and its surroundings by this method will now be described.

By using the protrusion portion 24 to precedingly press at least part of the portion to be molded into the flange ridgeline 8, a difference in deformation speed occurs between the precedingly pressed region and other regions. Hence, factors for a shear deformation field in the portion to be molded into the flange ridgeline 8 can be enhanced with reliability.

In other words, this is because, by using the bending tool 25 including the protrusion portion 24, a deformation factor of the flange ridgeline 8 is changed from a factor for a shrink flange deformation field (the strain ratio $\beta$ ($\varepsilon 2/\varepsilon 1$)<−1; a wall thickness increase) to a factor for a shear deformation field (the strain ratio $\beta$ ($\varepsilon 2/\varepsilon 1$)≈−1; no sheet thickness change). In addition, surplus wall thicknesses that may occur in the flange ridgeline 8 are pushed out to the surroundings and are dispersed. By these, wrinkles that may occur in the flange ridgeline 8 and its surroundings and excessive sheet thickness increases can be suppressed effectively.

The pressing by the protrusion portion 24 is preferably performed on the position of the center in the perimeter direction of the flange ridgeline 8, but may be performed on a position deviated from the position of the center in the perimeter direction of the flange ridgeline 8.

The height h (mm) of the protrusion portion 24 provided on the surface of the bending tool 25 preferably satisfies Formula (1) below with respect to the radius of curvature rf (mm) of the bending of the flange ridgeline 8. This is because, if the height h of the protrusion portion 24 is less than (0.5×rf), the effect of forming a shear deformation field in the flange ridgeline 8 to suppress the increase in sheet thickness will be small; and if the height h is more than (3.5×rf), damage to the protrusion portion 24 may be caused.

$$0.5 \times rf \leq h \leq 3.5 \times rf \quad (1)$$

Thus, in the first step, the production apparatus 20 uses the punch 21, the protrusion-provided dies 22, and the pad 23 to mold the blank 26 into the intermediate molded product 27, through a process in which the protrusion portions 24 press portions corresponding to the flange ridgelines 8 earlier than portions other than the protrusion portions 24 press.

(2) Case 1-2 (First Step; Production Apparatus 30 and Production Apparatus 40)

Figure 17:
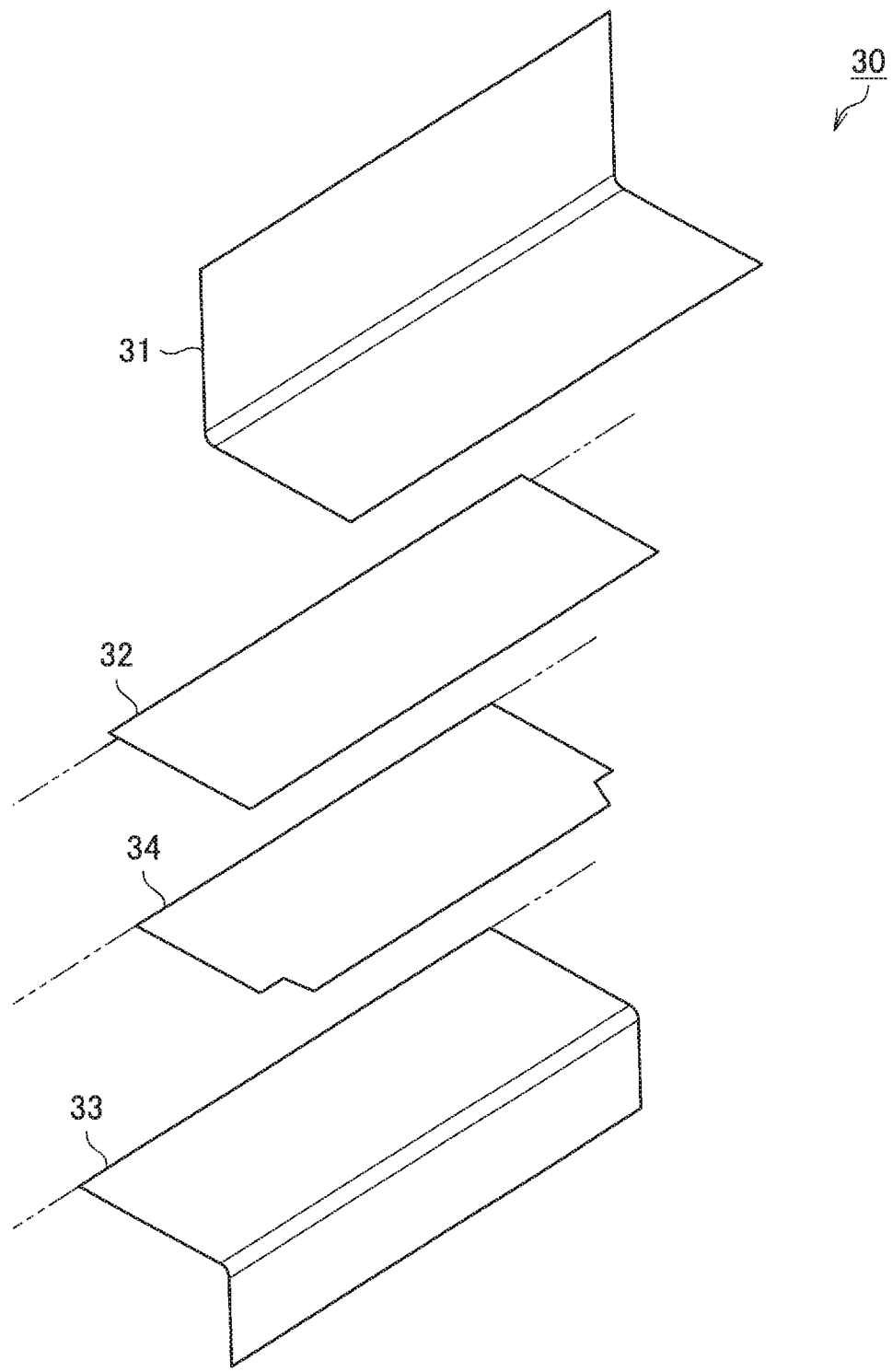
FIG. 17 is an explanatory diagram showing a production apparatus 30.
Figure 18:
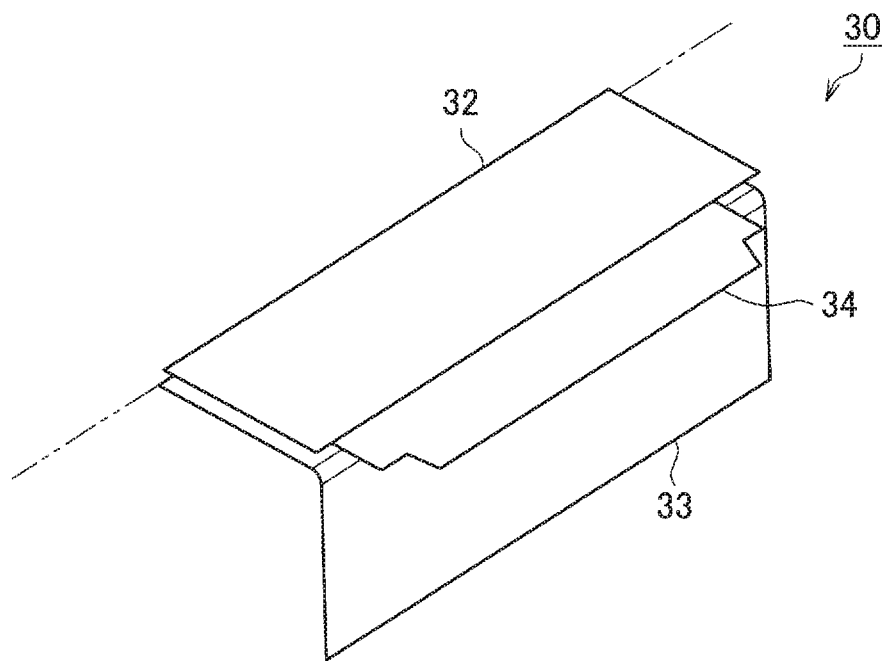
FIG. 18 is an explanatory diagram showing a blank before a start of preliminary molding in the production apparatus 30.
Figure 19:
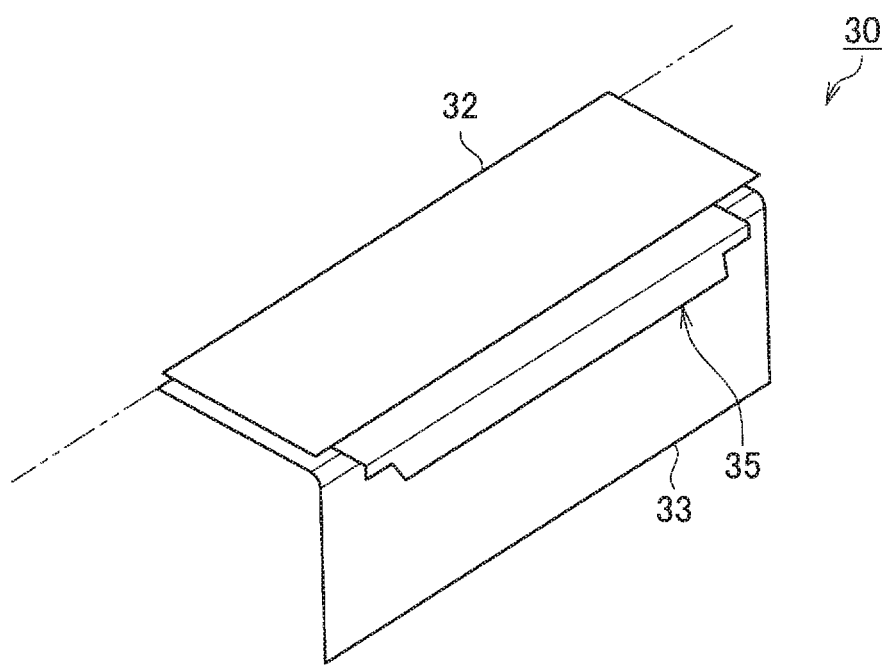
FIG. 19 is an explanatory diagram showing a blank after an end of preliminary molding by the production apparatus 30.

FIG. 17 is an explanatory diagram showing a production apparatus 30 used in Case 1-2. FIG. 18 is an explanatory diagram showing a blank 34 before the start of preliminary molding in the production apparatus 30. FIG. 19 is an explanatory diagram showing a preliminary molded product 35 produced by being subjected to preliminary molding by the production apparatus 30. FIGS. 17 to 19 illustrate a half of the production apparatus 30. In FIG. 18 and FIG. 19 of the production apparatus 30, a description of a die 31 is omitted for easier viewing of the drawings.

The production apparatus 30 includes dies 31, pads 32, and punches 33 arranged facing the dies 31 and the pads 32; and performs press molding on a blank 34 to mold portions corresponding to the floor flanges 9, and produces a preliminary molded product 35.

Figure 20:
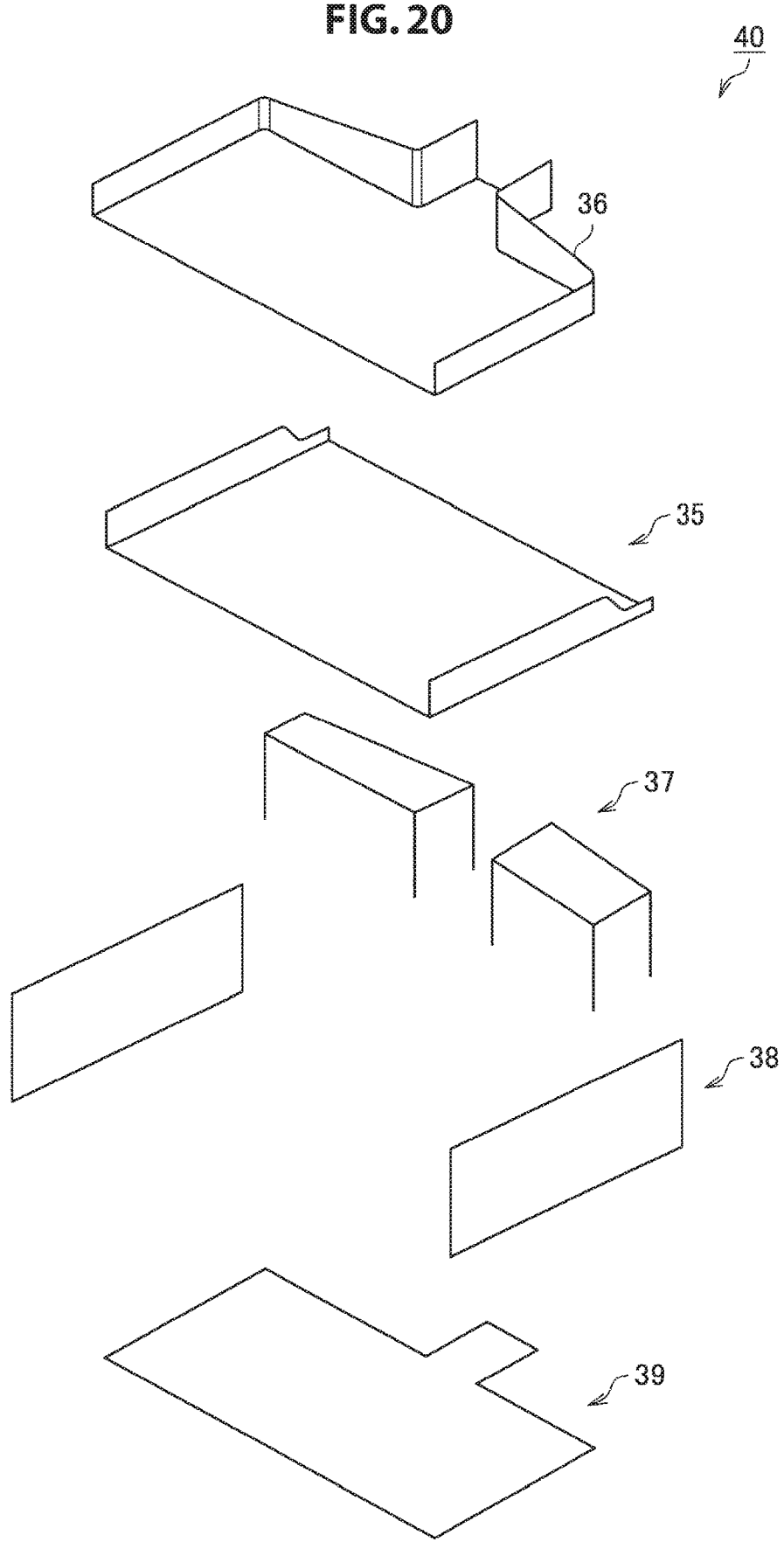
FIG. 20 is an explanatory diagram showing a production apparatus 40.
Figure 21:
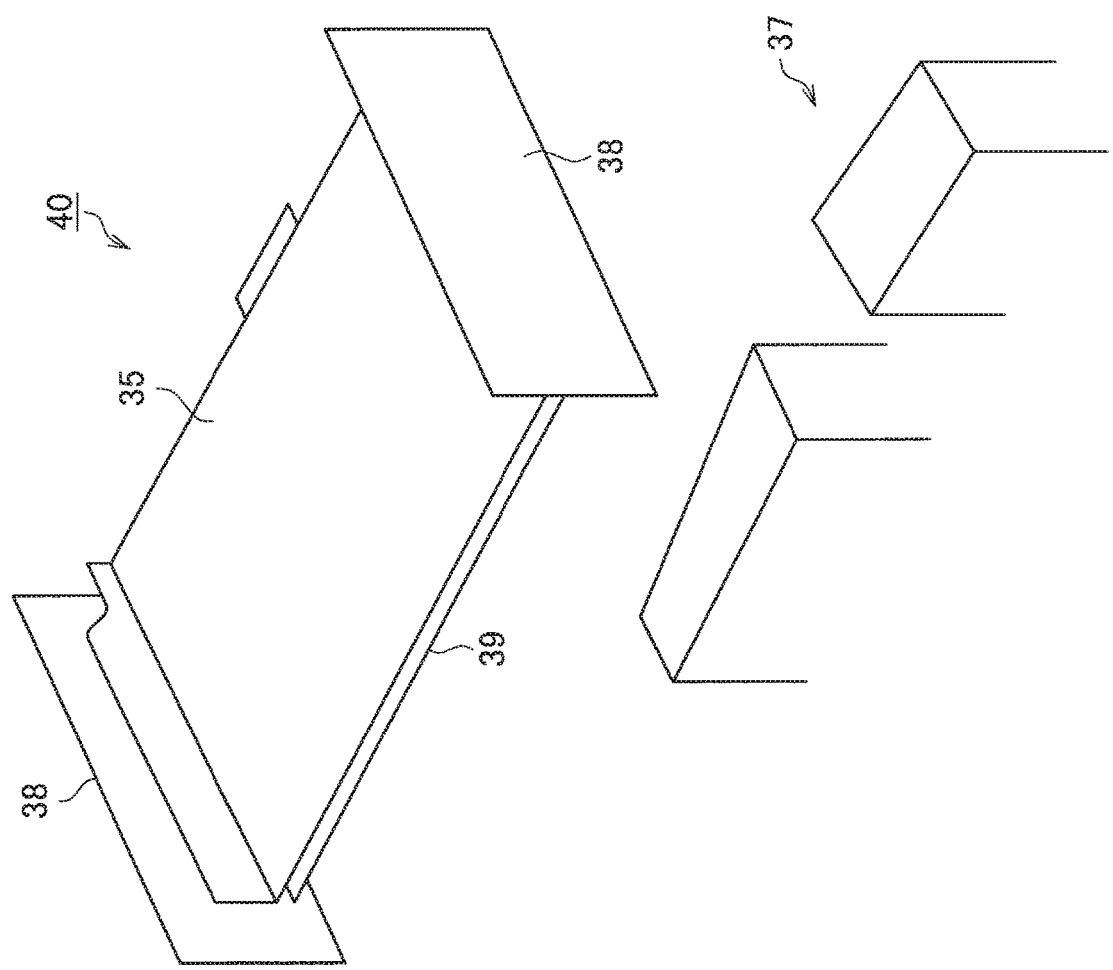
FIG. 21 is an explanatory diagram showing placement of a preliminary molded product before a start of molding in the production apparatus 40.
Figure 21:
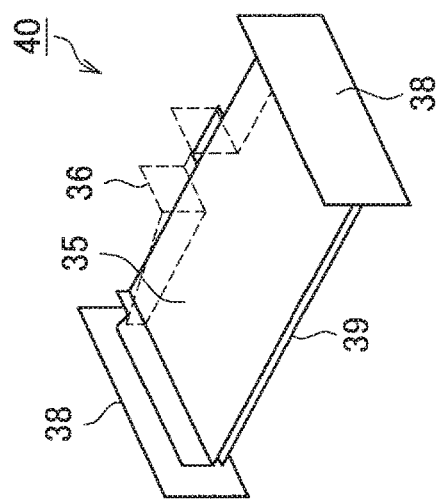
Figure 22:
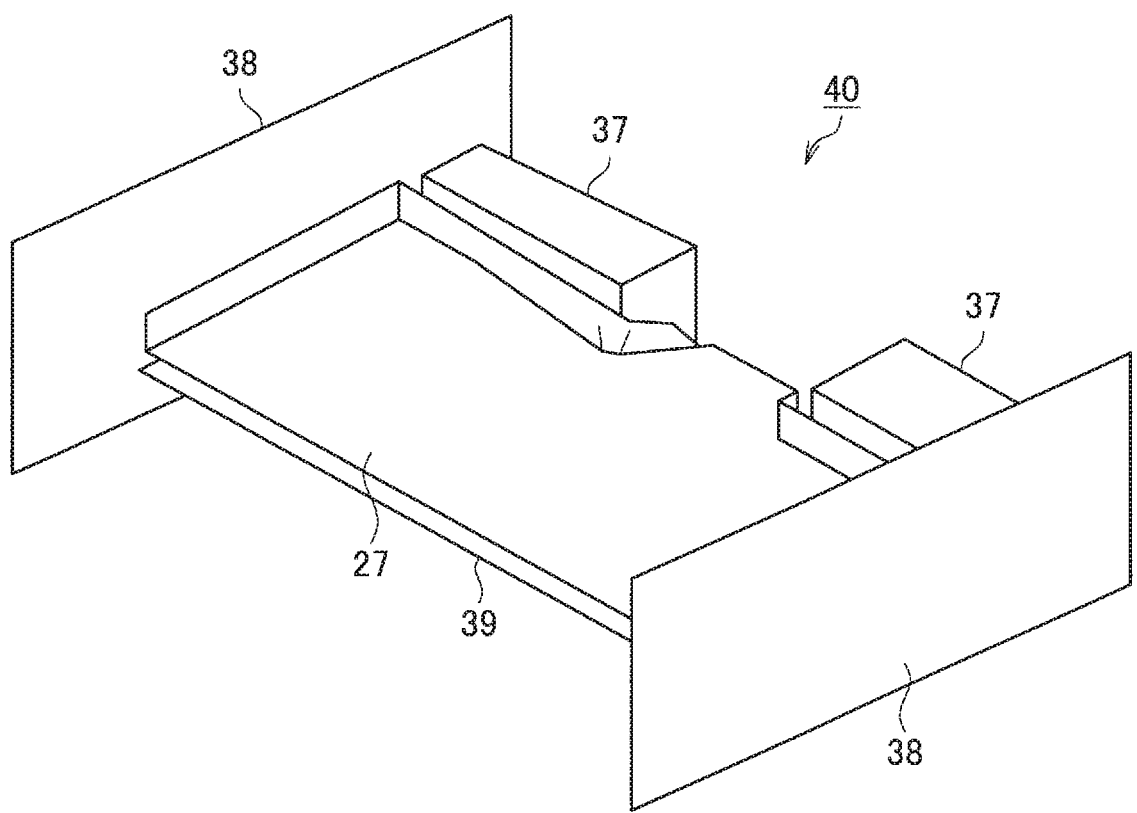
FIG. 22 is an explanatory diagram showing a situation of a molding bottom dead center of the production apparatus 40.

FIG. 20 is an explanatory diagram showing a production apparatus 40. FIG. 21 is an explanatory diagram showing the placement of the preliminary molded product 35 before the start of molding in the production apparatus 40. FIG. 22 is an explanatory diagram showing a situation of the molding bottom dead center based on the production apparatus 40. In FIGS. 21 and 22, a description of a punch 36 is omitted for easier viewing of the drawings. The diagram at the upper right of FIG. 21 shows the punch 36 with the broken line.

The production apparatus 40 molds the preliminary molded product 35 into an intermediate molded product 27. Tools included in the production apparatus 40 are a punch 36, dies 37 arranged facing the punch 36, out-of-plane deformation suppression tools 38 that are arranged in the vicinities of portions corresponding to the flange ridgelines 8 so as to face the punch 36, and a pad 39. At the start of molding, using these tools, portions of the preliminary molded product 35 corresponding to the flange ridgelines 8 are molded while the preliminary molded product 35 is pressed and restrained by the punch 36 and the pad 39; and an intermediate molded product 27 is molded.

During press molding, portions of the preliminary molded product 35 corresponding to the floor flanges 9 are restrained by the out-of-plane deformation suppression tools 38 and side surfaces of the punch 36, and thereby the out-of-plane deformation of these portions during molding is suppressed.

The out-of-plane deformation suppression tool 38 is placed while a gap obtained by, as necessary, adding a clearance to the sheet thickness of the preliminary molded product 35 is provided from a side surface of the punch 36.

Specifically, the out-of-plane deformation suppression tool 38 is preferably placed facing a surface of a portion of the preliminary molded product 35 that corresponds to the floor flange 9 during press molding, so as to have a gap of a prescribed distance x in the sheet thickness direction of the preliminary molded product 35. As a result, the out-of-plane deformation of the portion corresponding to the floor flange 9 can be suppressed with reliability. The prescribed distance x is prescribed by Formula (2): 1.00×t≤x<1.40×t (provided that t represents the sheet thickness (mm) of the preliminary molded product 35 and x represents the distance (mm)).

In addition, the sheet thickness in the flange ridgeline 8 and its surrounding region where the sheet thickness is increased from the sheet thickness before press molding of the preliminary molded product 35 is set not to exceed, even at the maximum, 1.5 times the sheet thickness before press molding mentioned above. To suppress mold galling during molding, it is preferable to provide a minute gap. When the sheet thickness is thin, the occurrence of out-of-plane deformation is significant; thus, it is preferable that the portion between the out-of-plane deformation suppression tool 38 and the punch 36 have a gap of a prescribed distance x in the sheet thickness direction of the preliminary molded product 35. The prescribed distance x is prescribed by Formula (3): $1.03 \times t \leq x < 1.35 \times t$ (provided that t represents the sheet thickness (mm) of the preliminary molded product 35 and x represents the distance (mm)).

The out-of-plane deformation suppression tool 38 may be provided at the die 37, but is not limited to this example. It is sufficient for the out-of-plane deformation suppression tool 38 to be able to restrain a portion of the preliminary molded product 35 corresponding to the floor flange 9. Hence, the installation position of the out-of-plane deformation suppression tool 38 is not limited to a specific position. Further, the out-of-plane deformation suppression tool 38 may be placed as a lower mold, not attached to an upper mold.

Thus, the production apparatus 30 uses the pads 32, the dies 31, and the punches 33 to perform press molding on a blank 26. Thereby, a preliminary molded product 35 in which portions corresponding to the floor flanges 9 are molded is produced. Next, the production apparatus 40 uses the punch 36, the dies 37, the out-of-plane deformation suppression tools 38, and the pad 39 to mold portions of the preliminary molded product 35 corresponding to the flange ridgelines 8, and thereby molds an intermediate molded product 27.

Although not shown, in the first step, press molding may be performed while a blank 26 or 34 is pressed by, together with the dies 22 or 31, blank holders arranged facing the dies 22 or 31.

(3) Case 2-1 (Second Step; Production Apparatus 50)

Figure 23:
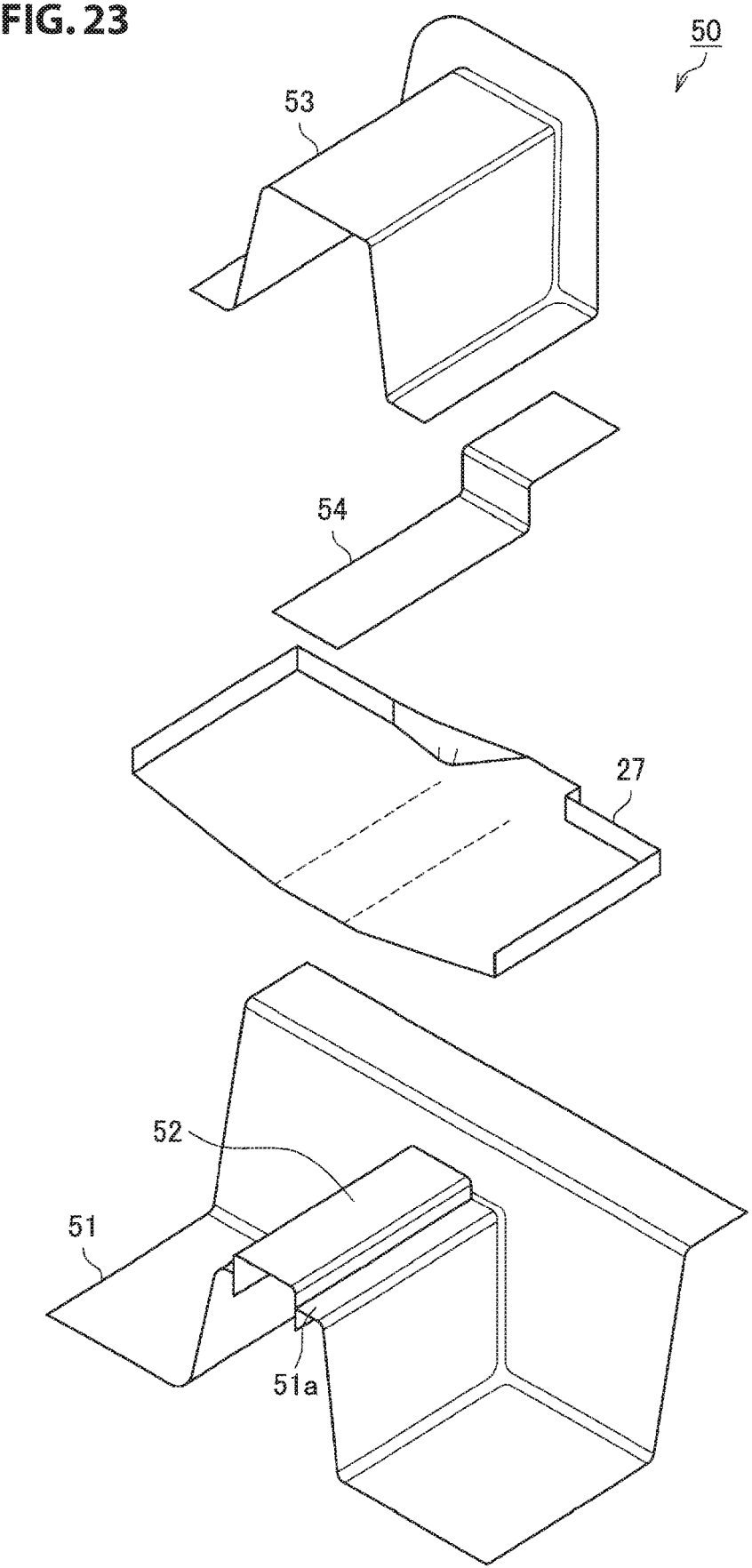
FIG. 23 is an explanatory diagram showing a configuration of a production apparatus of an example of a production apparatus 50.
Figure 24:
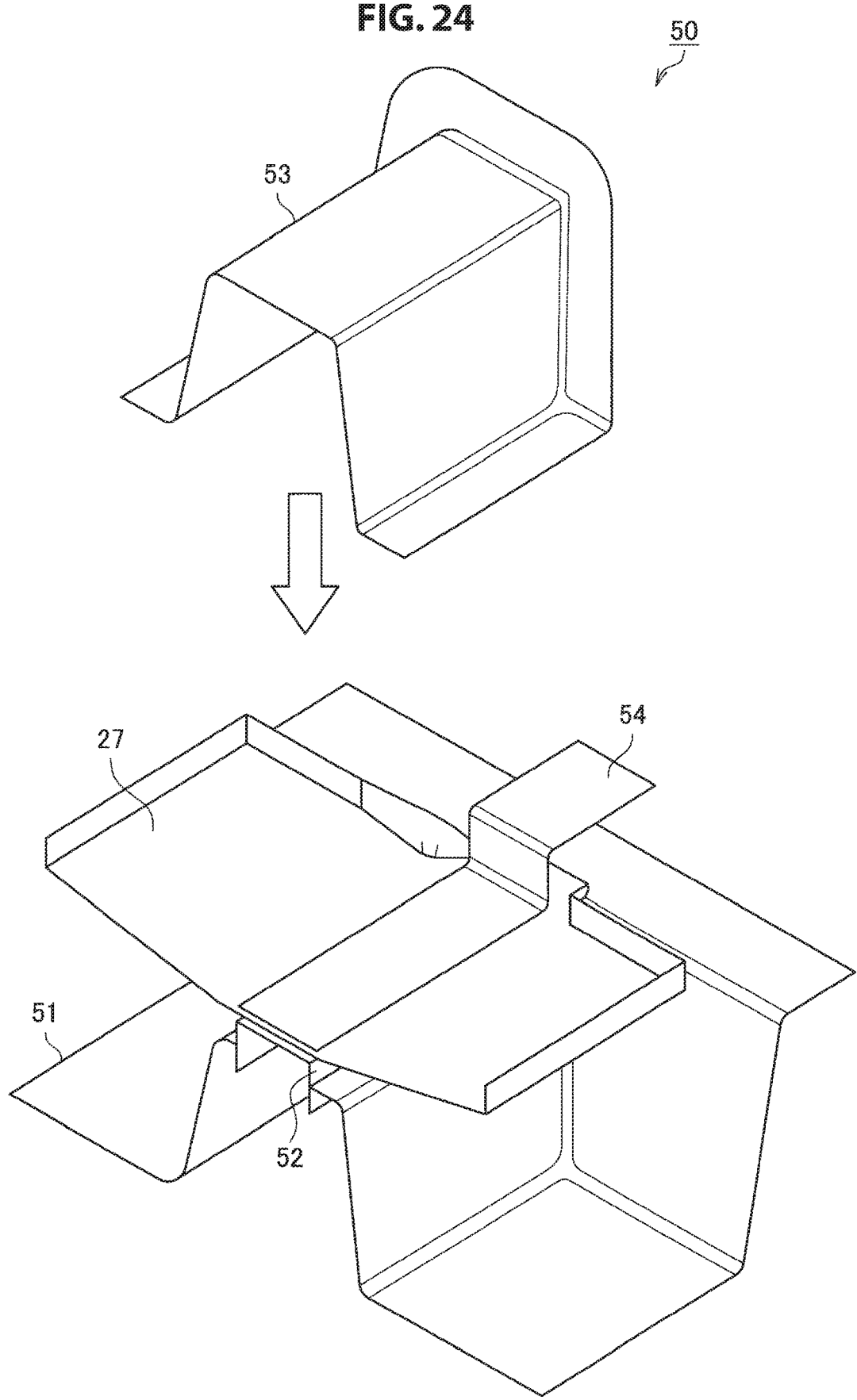
FIG. 24 is an explanatory diagram showing a placement situation of an intermediate molded product in the production apparatus 50.
Figure 25:
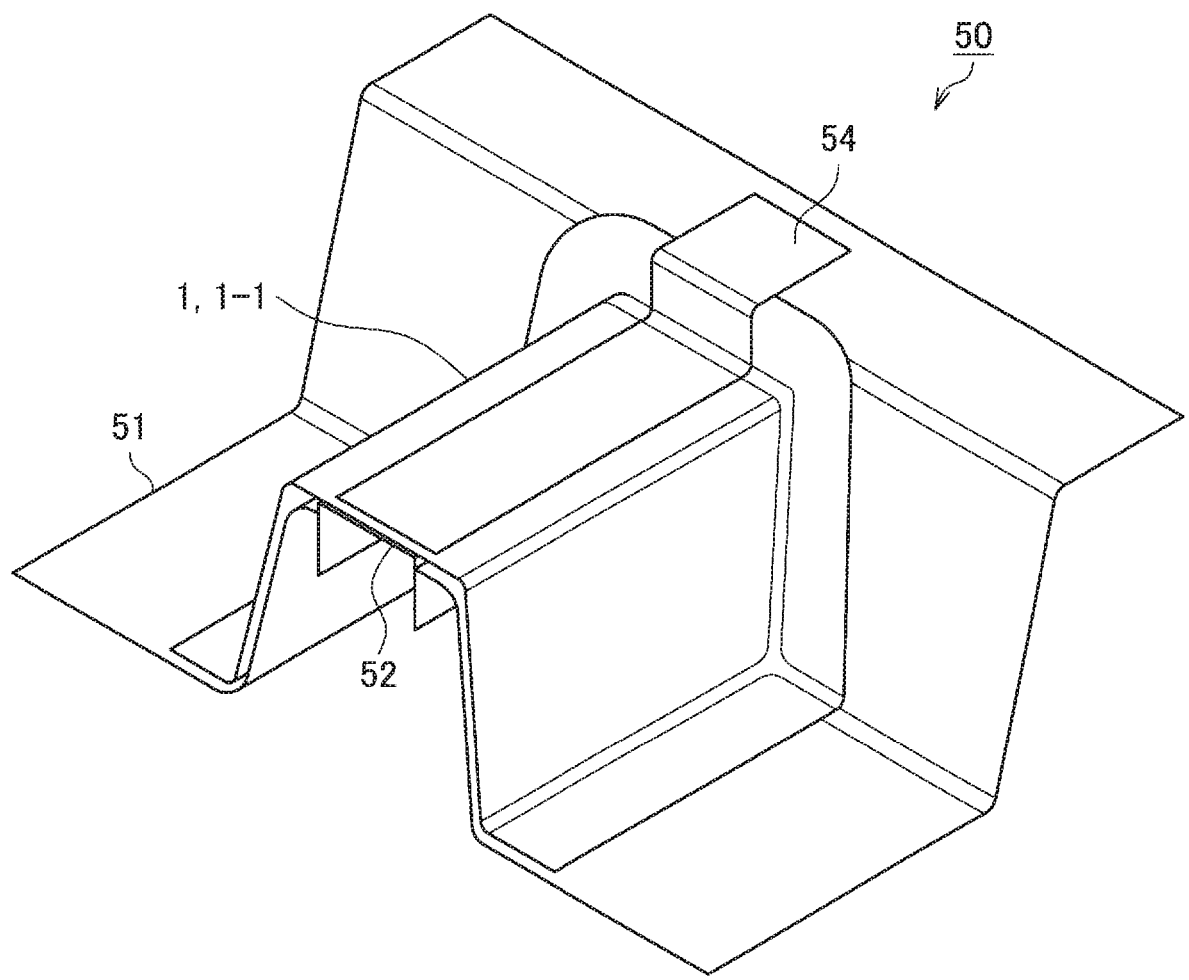
FIG. 25 is an explanatory diagram showing a situation of a molding bottom dead center in the production apparatus 50.

FIG. 23 is an explanatory diagram showing the configuration of a production apparatus 50. FIG. 24 is an explanatory diagram showing a placement situation of the intermediate molded product 27 in the production apparatus 50. FIG. 25 is an explanatory diagram showing a situation of the molding bottom dead center in the production apparatus 50. In FIG. 25, a description of a die 53 is omitted.

As shown in FIGS. 23 to 25, the production apparatus 50 includes a punch 51 including an inner pad 52 that is placed so as to be able to freely enter and exit a punch top portion 51a and a die 53 placed facing the punch 51 and supporting a die pad 54.

In the second step, the second apparatus 50 uses the inner pad 52 and the die pad 54 to start press molding while separating the intermediate molded product 27 from the punch top portion 51a. In more detail, an intermediate molded product 27 or 40 is sandwiched by the inner pad 52 and the die pad 54 in a state where the inner pad 52 is kept protruding. Next, the die 53 is moved downward, the die 53 pushes the die pad 54, the intermediate molded product 27 or 40 and the inner pad 52 are pushed by the die pad 54, and molding progresses. At the molding bottom dead center, the inner pad 52 enters a state of being housed in the punch 51. Thereby, portions of the vertical wall flanges 10 in the member 1 or 12 that were not molded in the first step, the top sheet flange 11, and the upper ridgelines 4 can be molded.

(4) Case 2-2 (Second Step; Production Apparatus 60)

Figure 26:
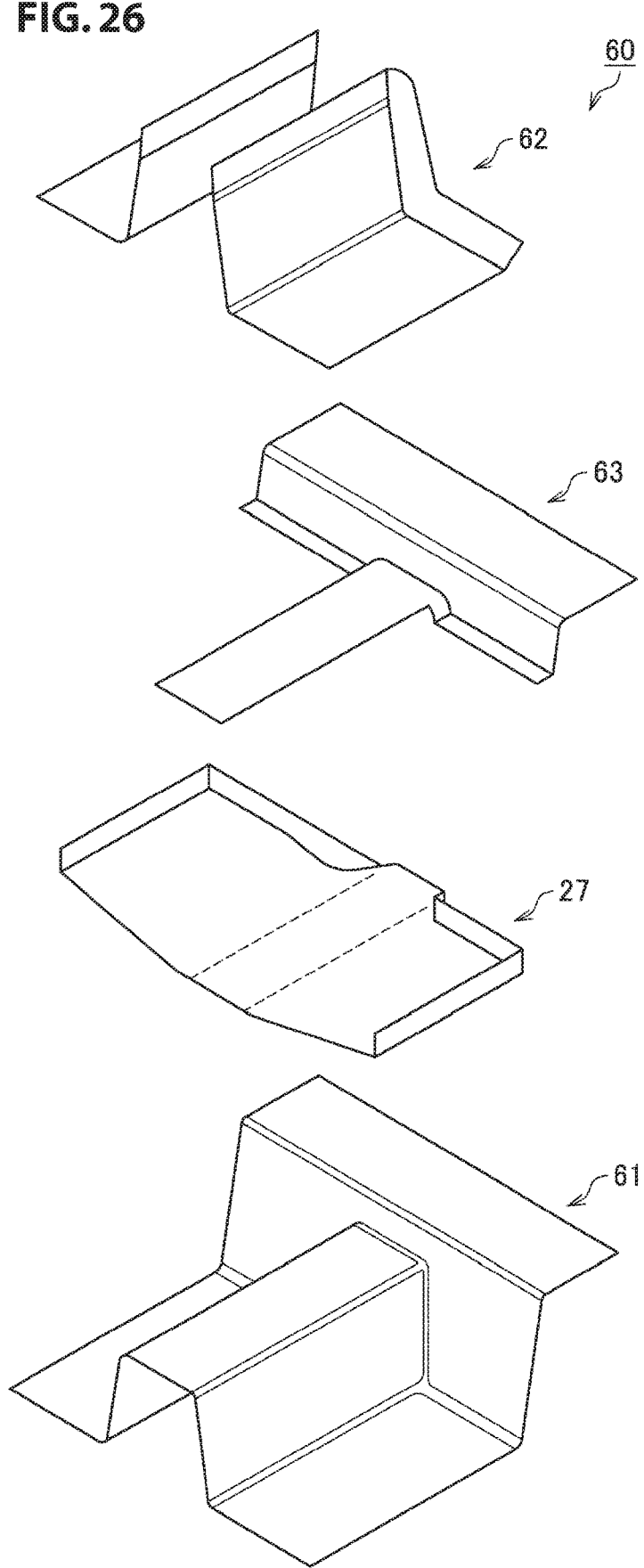
FIG. 26 is an explanatory diagram showing a configuration of a production apparatus of another example of a production apparatus 60.
Figure 27:
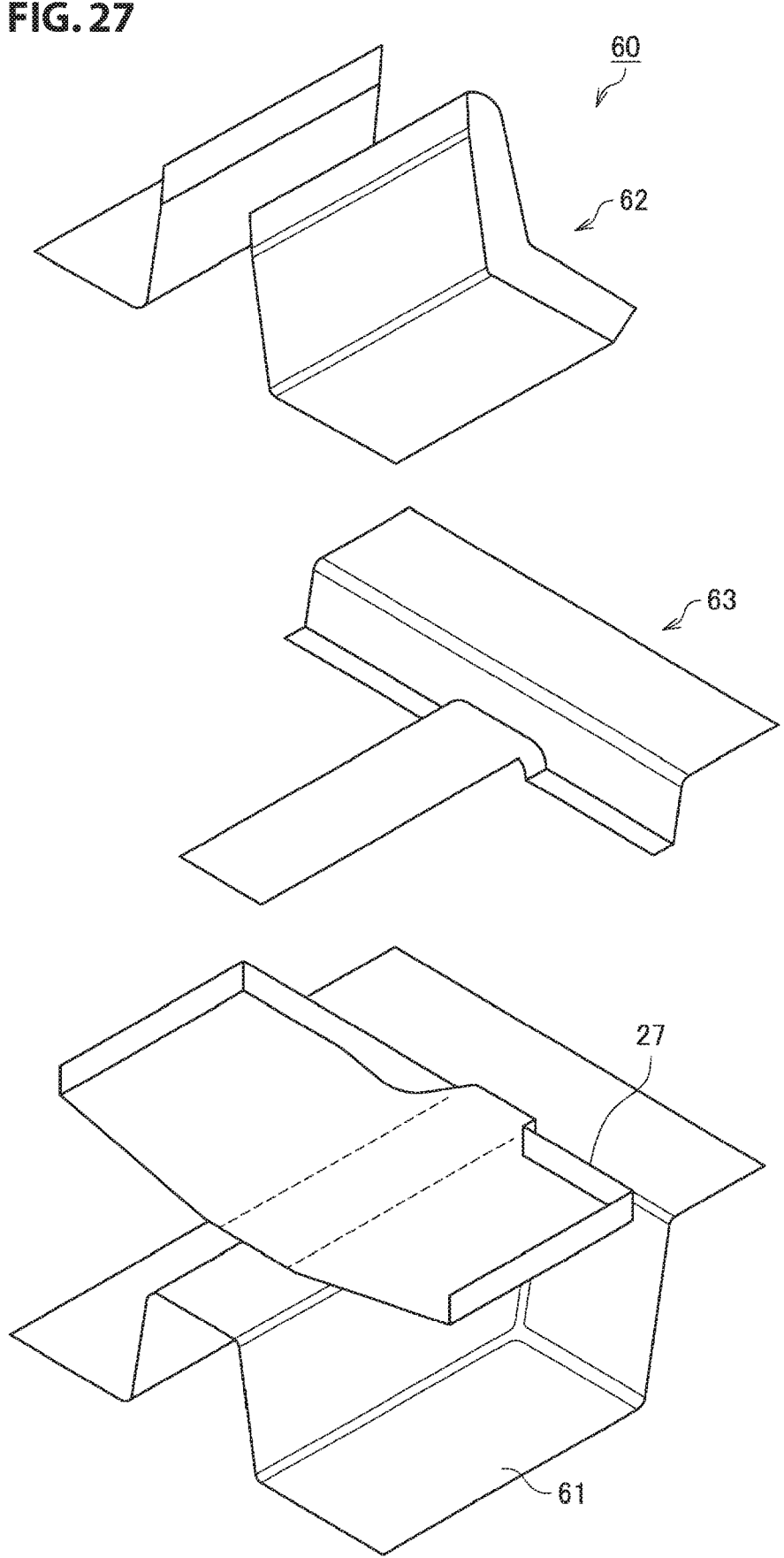
FIG. 27 is an explanatory diagram showing a placement situation of an intermediate molded product in the production apparatus 60.
Figure 28:
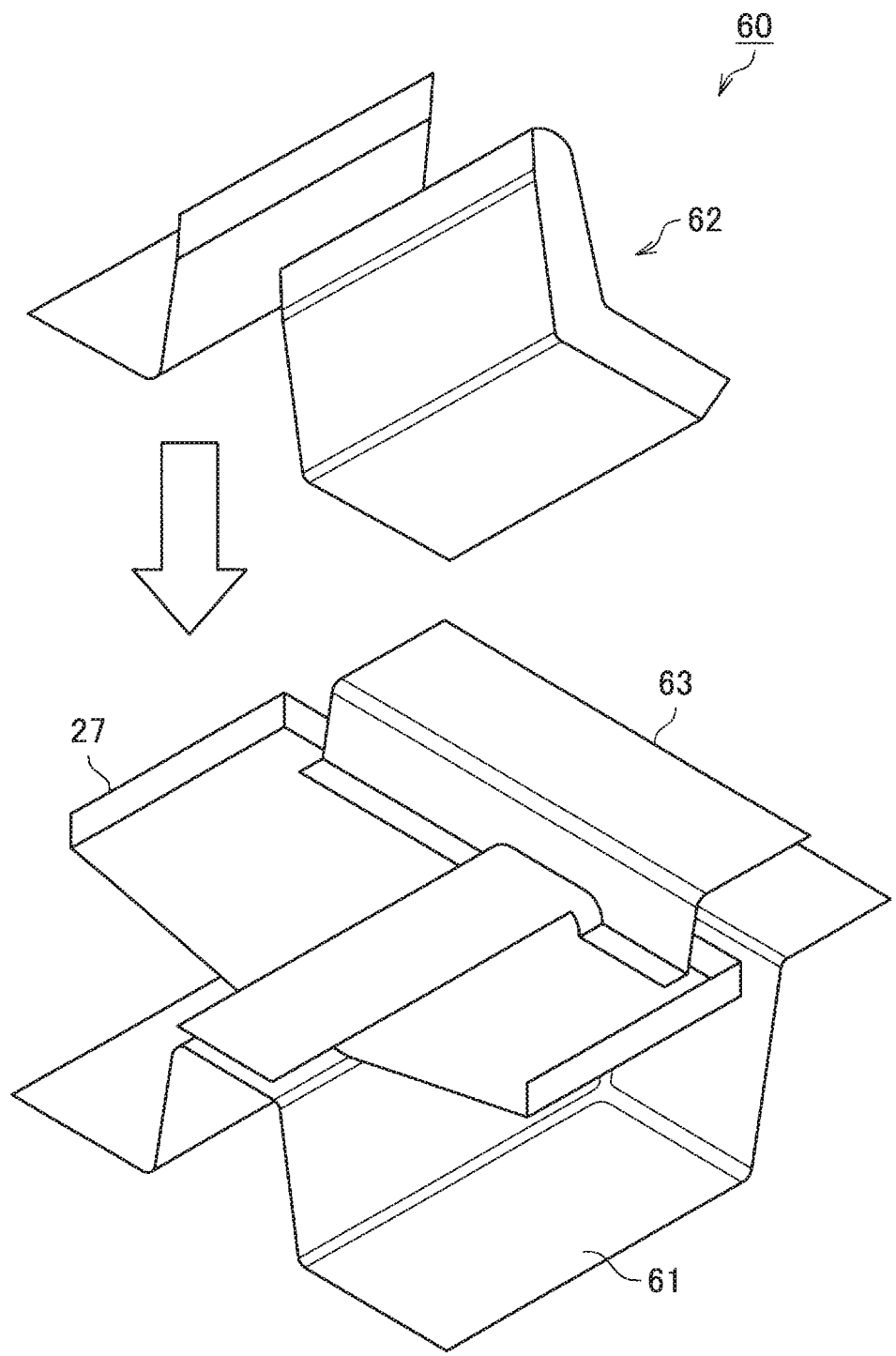
FIG. 28 is an explanatory diagram showing a situation of a ridgeline pad in the production apparatus 60 at a time of holding.
Figure 29:
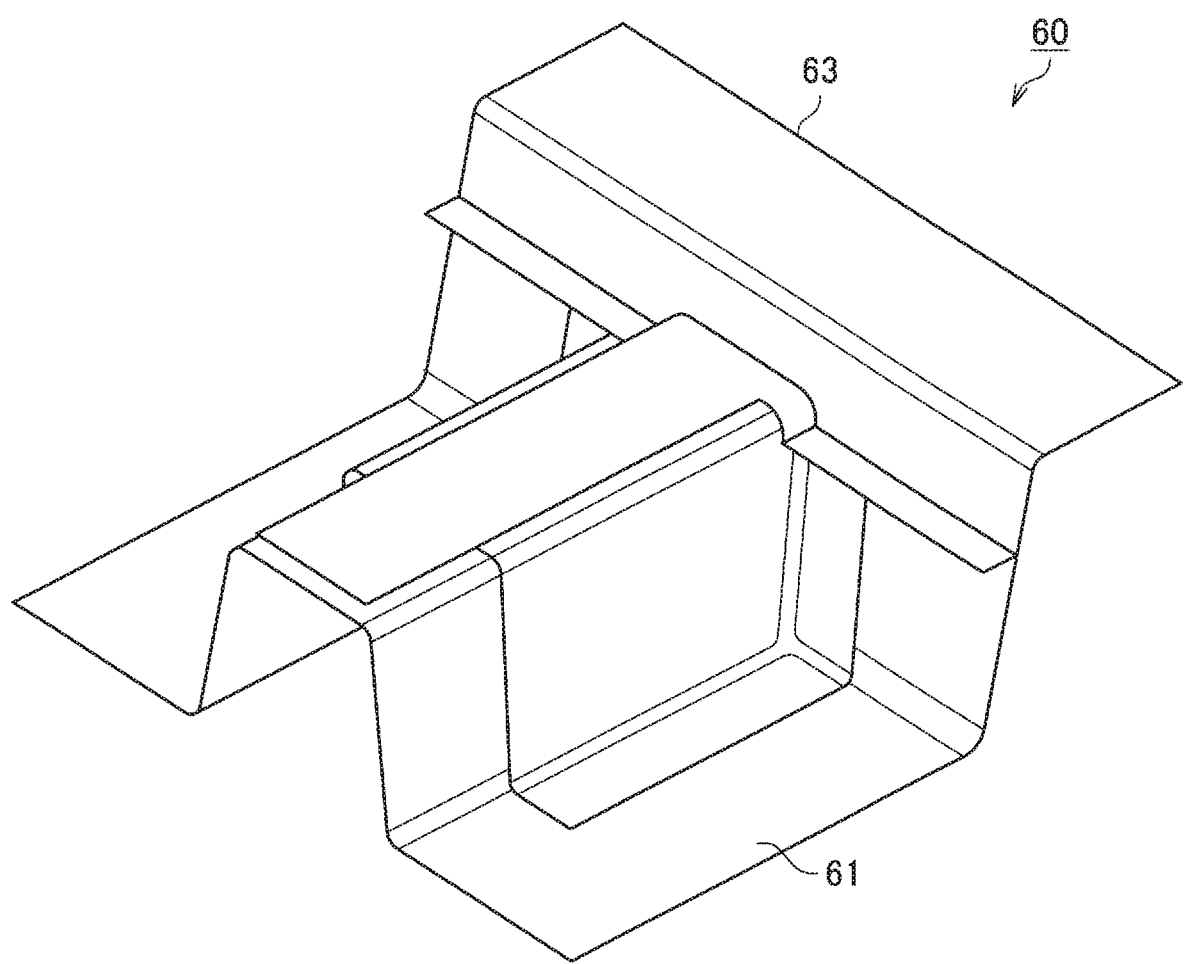
FIG. 29 is an explanatory diagram showing a situation of a molding bottom dead center in the production apparatus 60.

FIG. 26 is an explanatory diagram showing the configuration of a production apparatus 60. FIG. 27 is an explanatory diagram showing a placement situation of the intermediate molded product 27 in the production apparatus 60. FIG. 28 is an explanatory diagram showing a situation of a ridgeline pad 63 in the production apparatus 60 at the time of holding. FIG. 29 is an explanatory diagram showing a situation of the molding bottom dead center in the production apparatus 60. In FIG. 29, dies 62 are omitted.

As shown in FIGS. 26 to 29, the second apparatus 60 includes a punch 61, dies 62 placed facing the punch 61, and a ridgeline pad 63 that pushes portions to be molded into places in each of which an end portion of the top sheet ridgeline 6, an end portion of the upper ridgeline 4, and an end portion of the vertical wall ridgeline 7 are linked together.

In the second step, the production apparatus 60 uses the ridgeline pad 63 to perform press molding. The ridgeline pad 63 pushes portions of the intermediate molded product 27 that are to be molded into places in each of which an end portion of the top sheet ridgeline 6, an end portion of the upper ridgeline 4, and an end portion of the vertical wall ridgeline 7 are linked together. In this way, end portions of the upper ridgelines 4, the top sheet ridgeline 6, and the top sheet flange 11 are molded. Next, the dies 62 are moved toward the punch 61, and the upper ridgelines 4 are molded in the intermediate molded product 27. Thus, the member 1 or 12 is produced. Thereby, portions of the vertical wall flanges 10 in the member 1 or 12 that were not molded in the first step, the top sheet flange 11, and the upper ridgelines 4 can be molded.

REFERENCE SIGNS LIST 1 member
2 top sheet
3 vertical wall
4 upper ridgeline
5 lower ridgeline
6 top sheet ridgeline
7 vertical wall ridgeline
8 flange ridgeline
9 floor flange
10 vertical wall flange
11 top sheet flange
12 member (a vertical wall being a triangle)
26 expansion blank
27 intermediate molded product

The invention claimed is:
1. A member comprising:
 a top sheet;
 two facing vertical walls provided on both sides of the top sheet via upper ridgelines;
 a top sheet flange extending on an outside of the member via a top sheet ridgeline of the top sheet existing on a side of an end portion of the member;
 two vertical wall flanges each extending on the outside of the member via a vertical wall ridgeline of the vertical wall extending on the side of the end portion of the member; and
 two floor flanges each of which is adjacent to the vertical wall flange and extends on the outside of the member via a lower ridgeline that extends on an end portion of the vertical wall different from an end portion of the vertical wall on the side of the end portion of the member, wherein the vertical wall flange and the floor flange adjacent to an end portion of the vertical wall flange are continuous with each other, and in the end portion of the member, a sum total$\Sigma R$ of radii of curvature of angles of the vertical walls each between the lower ridgeline and the vertical wall ridgeline and a sum total$\Sigma L$ of widths of the top sheet and the vertical walls in the end portion of the member have a relation of $\Sigma R/\Sigma L \leq 0.13$.

2. The member according to claim 1, wherein the radius of curvature of the angle of the vertical wall between the lower ridgeline and the vertical wall ridgeline is less than or equal to 20 mm.

3. The member according to claim 1, wherein the top sheet flange and the vertical wall flange are continuous.

4. The member according to claim 1, wherein the vertical wall is a triangle, and the floor flange serves also as the vertical wall flange.

5. A method for producing a press-molded product, the method being for producing the member according to claim 1, the method comprising:

a first step of molding, in a shrink flange manner, at least parts of floor flanges and parts of vertical wall flanges continuous to the floor flanges, in at least two places of a blank; and a second step of, following the first step, molding, in a stretch flange manner, a top sheet flange and remaining parts of the vertical wall flanges continuous to the top sheet flange, in at least two places between the at least two places of the blank in the first step.

\* \* \* \* \*